(12) United States Patent
Park et al.

(10) Patent No.: US 10,817,034 B2
(45) Date of Patent: Oct. 27, 2020

(54) WEARABLE ELECTRONIC DEVICE AND OPERATING METHOD THEREFOR

(71) Applicant: Samsung Electronics Co., Ltd., Gyeonggi-do (KR)

(72) Inventors: Chan-Soo Park, Seoul (KR); Ki-Hoon Kang, Gyeonggi-do (KR); Hyun-Su Hong, Gyeonggi-do (KR); Tae-Ho Kim, Chungcheongbuk-do (KR); Jeong-Min Park, Gyeonggi-do (KR)

(73) Assignee: Samsung Electronics Co, Ltd., Yeongtong-gu, Suwon-si, Gyeonggi-do (KR)

( * ) Notice: Subject to any disclaimer, the term of this patent is extended or adjusted under 35 U.S.C. 154(b) by 182 days.

(21) Appl. No.: 16/095,999

(22) PCT Filed: Jun. 2, 2017

(86) PCT No.: PCT/KR2017/005793
§ 371 (c)(1),
(2) Date: Oct. 24, 2018

(87) PCT Pub. No.: WO2017/209565
PCT Pub. Date: Dec. 7, 2017

(65) Prior Publication Data
US 2019/0138068 A1    May 9, 2019

(30) Foreign Application Priority Data
Jun. 3, 2016 (KR) .......................... 10-2016-0069806

(51) Int. Cl.
*G06F 1/26* (2006.01)
*G06F 1/16* (2006.01)
(Continued)

(52) U.S. Cl.
CPC ................. *G06F 1/26* (2013.01); *G01P 13/00* (2013.01); *G06F 1/163* (2013.01); *G06F 1/3287* (2013.01)

(58) Field of Classification Search
CPC .......... G06F 1/26; G06F 1/163; G06F 1/3287; G01P 13/00
See application file for complete search history.

(56) References Cited

U.S. PATENT DOCUMENTS 8,706,172 B2 * 4/2014 Priyantha .......... H04W 52/0293
455/574
8,992,433 B1    3/2015 Brady et al.
(Continued)

FOREIGN PATENT DOCUMENTS

KR    10-2014-0102070 A    8/2014
KR    10-2015-0075981 A    7/2015

*Primary Examiner* — Stefan Stoynov
(74) *Attorney, Agent, or Firm* — Cha & Reiter, LLC.

(57) ABSTRACT

According to various examples of the present invention, a wearable electronic device comprises: an energy harvester for generating electric energy on the basis of a movement or a change in the shape of the wearable electronic device; a first processor for controlling the energy harvester; a first sensor and a second sensor; and a second processor for controlling the first sensor and the second sensor, wherein the first processor transmits, to the second processor, a control signal for transitioning the second processor into an activated state if the electric energy generated by the energy harvester satisfies a designated first condition, and the second processor can be set such that first sensor data is acquired through the first sensor and second sensor data is selectively acquired from the second sensor according to whether the first sensor data satisfies a designated second condition, when the second processor is transitioned from an inactivated state to the activated state by responding to the control signal.

15 Claims, 20 Drawing Sheets

(51) Int. Cl.
    *G06F 1/32*     (2019.01)
    *G01P 13/00*     (2006.01)
    *G06F 1/3287*     (2019.01)

(56) References Cited

U.S. PATENT DOCUMENTS

| | | |
|---|---|---|
| 9,947,852 B2 * | 4/2018 | Schneider ................ H01L 35/32 |
| 10,630,078 B2 * | 4/2020 | Amin ........................ H02J 3/38 |
| 2012/0256492 A1 | 10/2012 | Song et al. |
| 2014/0142459 A1 | 5/2014 | Jayalth et al. |
| 2014/0229727 A1 | 8/2014 | Jun |
| 2014/0299783 A1 | 10/2014 | Valentino et al. |
| 2015/0102208 A1 | 4/2015 | Appelboom et al. |
| 2016/0026867 A1 | 1/2016 | Wexler et al. |

* cited by examiner

☐ : PROCESSOR (420)
◇ : SENSOR (430)
○ : ENERGY HARVESTER (415)

| Activity 1 | Activity 2 | DESCRIPTION |
|---|---|---|
| Stationary | No-wear | NOT-WORN STATE |
| | Lying-down | LYING-DOWN STATE |
| | Sitting | SITTING STATE |
| | Standing | STANDING STATE WITHOUT MOTION |
| | Leaning-back | LEANING-BACK STATE |
| Walking | Normal | MOVEMENT STATE IN DAILY LIFE |
| | Power | MOVEMENT STATE WITH HEAVY EXERCISE |
| | Trekking | IRREGULAR MOVEMENT STATE LIKE MOUNTAIN-CLIMBING |
| Running | Light | RUNNING STATE AT OR BELOW PREDETERMINED SPEED |
| | Heavy | RUNNING STATE AT OR ABOVE PREDETERMINED SPEED |
| | Marathon | RUNNING STATE AT PREDETERMINED SPEED FOR PREDETERMINED TIME |

FIG.11

| Activity 1 | Activity 2 | DESCRIPTION |
|---|---|---|
| Sports | Cycling | BIKE RIDING STATE |
| | Soccer | SOCCER PLAYING STATE |
| | Basketball | BASKETBALL PLAYING STATE |
| | Baseball | BASEBALL PLAYING STATE |
| | Swimming | SWIMMING STATE |
| Fitness | UPPER BODY | UPPER BODY WORKOUT STATE |
| | LOWER BODY | LOWER BODY WORKOUT STATE |
| | UPPER/LOWER BODY | UPPER/LOWER BODY WORKOUT STATE |
| Vehicle | Car driving | VEHICLE DRIVING STATE |
| | Passenge | RIDING AS PASSENGER STATE |

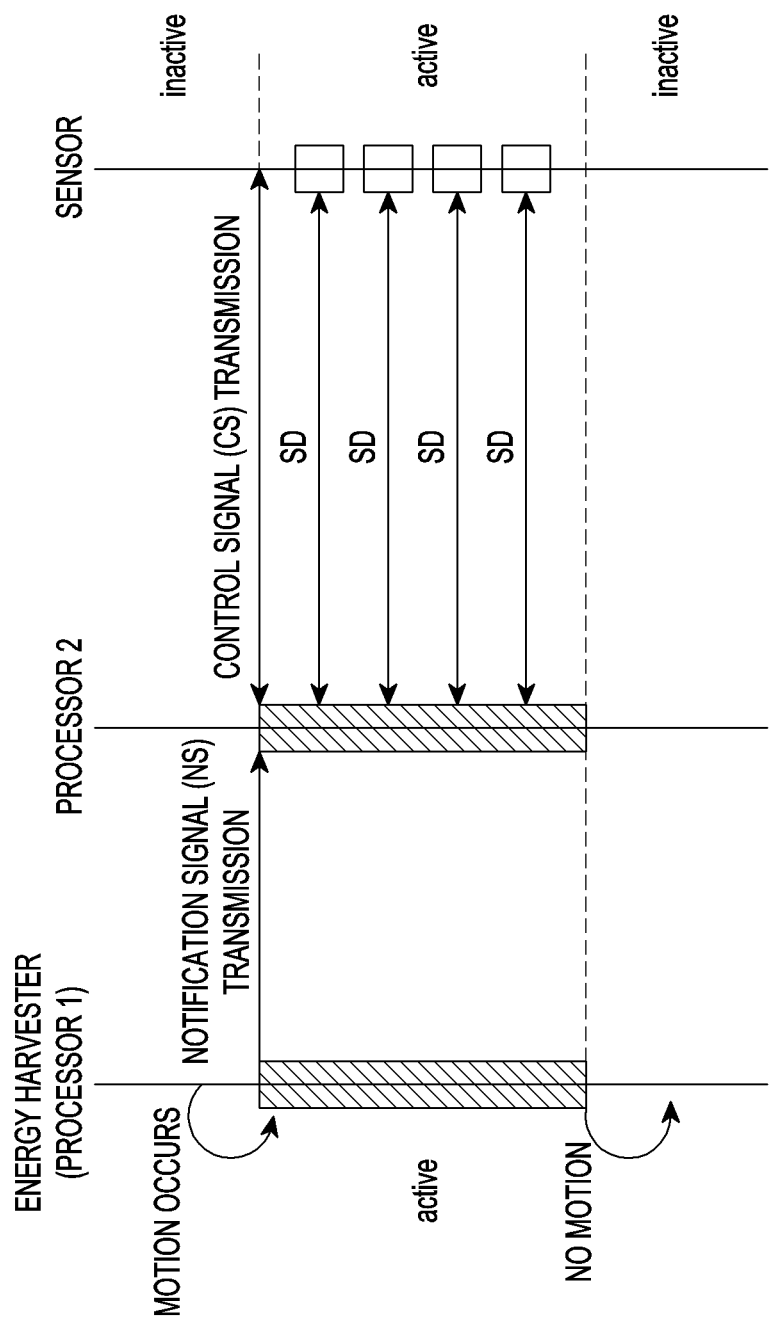

10,817,034 B2

WEARABLE ELECTRONIC DEVICE AND OPERATING METHOD THEREFOR

CROSS-REFERENCE TO RELATED APPLICATION(S)

This application is a National Phase Entry of PCT International Application No. PCT/KR2017/005793, which was filed on Jun. 2, 2017, and claims priority to Korean Patent Application No. 10-2016-0069806, which was filed on Jun. 3, 2016, the contents of which are incorporated herein by reference.

BACKGROUND

1. Field

Various embodiments of the present disclosure relate to a wearable electronic device for determining a user activity, and a method of operating the wearable electronic device.

2. Description of the Related Art

Smart clothes are a kind of wearable electronic device in which clothes are combined with an electronic device. Smart clothes may be configured in various forms ranging from the simple form of an electronic device attached to clothes to an electronic device embedded in clothes. Particularly, the fabric of smart clothes may be any of a sensor, a wire, a battery, an antenna, a display, and an input/output device. Further, smart clothes may include flexible or transparent devices as well as a solid type of hard devices. As such, smart clothes may be configured in various forms, and smart clothes may be stretched or folded.

SUMMARY

According to aspects of the present disclosure, a wearable electronic device for activating a sensor by using electrical energy generated from an energy harvester, and determining a user activity on the basis of sensor data acquired from the sensor is provided.

According to various embodiments of the present disclosure, a wearable electronic device may include an energy harvester for generating electrical energy on the basis of a motion with respect to the wearable electronic device or a change in the shape of the wearable electronic device, a first processor for controlling the energy harvester, a first sensor, and a second sensor, and a second processor for controlling the first sensor and the second sensor. If the electrical energy generated by the energy harvester satisfies a predetermined first condition, the first processor may be configured to transmit, to the second processor, a control signal for transitioning the second processor to an active state, and if the second processor is transitioned from an inactive state to an active state in response to the control signal, the second processor may be configured to acquire first sensor data from the first sensor, and to selectively acquire second sensor data from the second sensor according to whether the first sensor data satisfies a predetermined second condition.

According to various embodiments of the present disclosure, a method of operating a wearable electronic device may include generating electrical energy on the basis of a motion with respect to the wearable electronic device or a change in the shape of the wearable electronic device by an energy harvester, if the electrical energy generated by the energy harvester satisfies a predetermined first condition, transmitting, to a second processor, a control signal for transitioning the second processor to an active state by a first processor, if the second processor is transitioned from an inactive state to an active state in response to the control signal, acquiring first sensor data from a first sensor by the second processor, and selectively acquiring second sensor data from a second sensor by the second processor, according to whether the first sensor data satisfies a predetermined second condition.

A wearable electronic device, according to an embodiment of the present disclosure, can determine a user activity with low power consumption by activating a sensor by using electrical energy generated from an energy harvester.

Further, since the wearable electronic device, according to the embodiment of the present disclosure, can determine a user activity with low power consumption by activating a sensor by using electrical energy generated from the energy harvester, the wearable electronic device can use a lightweight battery with a small capacity.

BRIEF DESCRIPTION OF THE DRAWINGS

To fully understand the drawings in conjunction with which a detailed description of the present disclosure is given, each drawing is described in detail.

FIG. 11 illustrates an activity table stored in a memory according to an embodiment of the present disclosure.

FIG. 12 illustrates an activity table stored in a memory according to another embodiment of the present disclosure.

FIGS. 13a to 13c illustrate data flows for methods of operating an electronic device according to various embodiments of the present disclosure.

DETAILED DESCRIPTION

Figure 1:
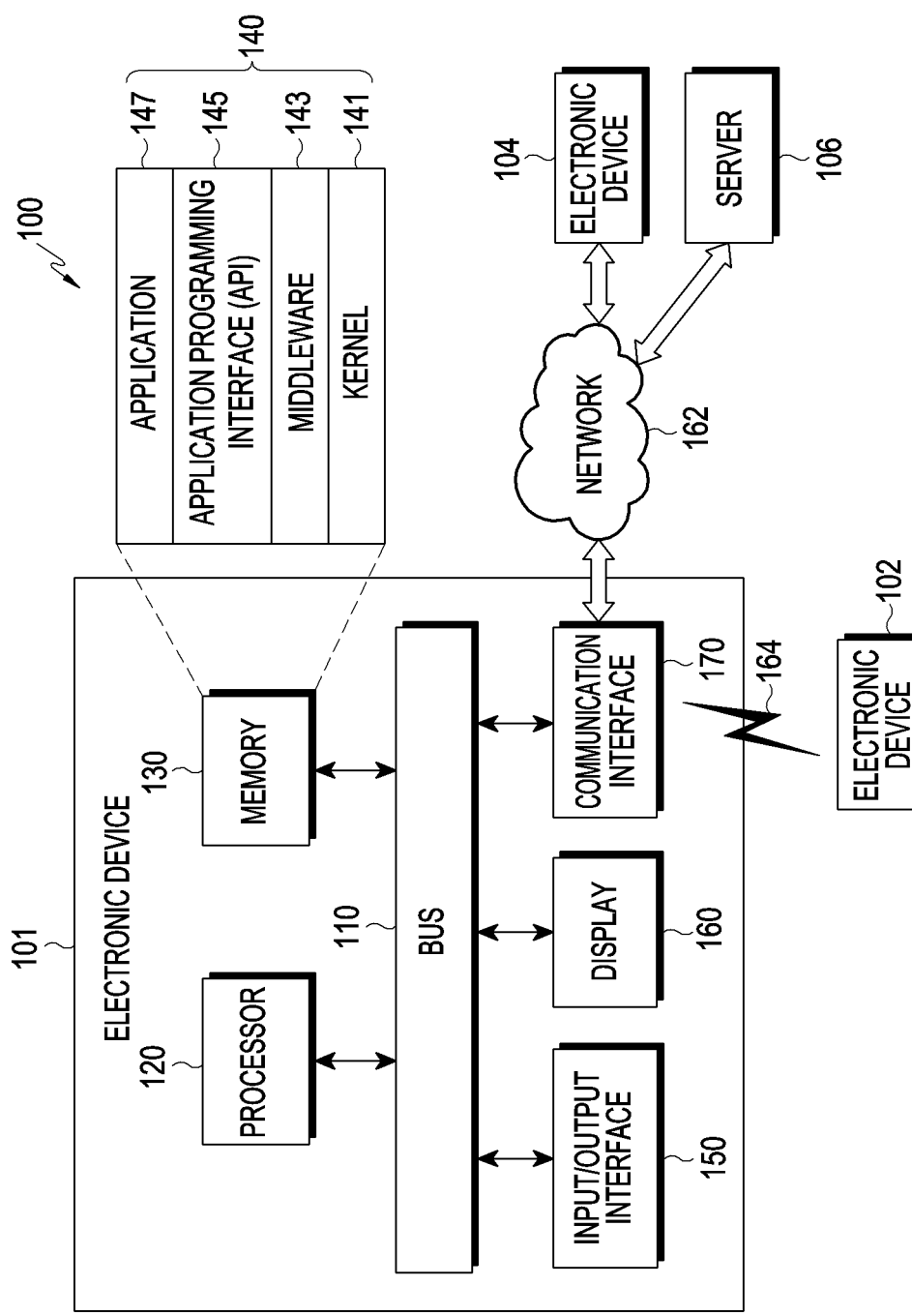
FIG. 1 is a block diagram of an electronic device and a network according to various embodiments of the present disclosure.

Various embodiments of the present disclosure will be described with reference to the attached drawings. It should be appreciated that the embodiments and terms used therein are not intended to limit the technological features set forth herein to particular embodiments and include various changes, equivalents, and/or replacements for a corresponding embodiment. With regard to the description of the drawings, similar reference numerals may be used to refer to similar elements. It is to be understood that a singular form of a noun corresponding to an item may include one or more of the things, unless the relevant context clearly indicates otherwise. As used herein, each of such phrases as "A or B" and "at least one of A and/or B" may include all possible combinations of the items enumerated together in a corresponding one of the phrases. As used herein, such terms as "1st" and "2nd," or "first" and "second" may be used to simply distinguish a corresponding component from another irrespective of importance or order, and does not limit the components in other aspect. It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly, or via a third element.

The term "configured to" as used herein may be replaced with, for example, the term "suitable for", "having the capacity to", "designed to", "adapted to", "made to", or "capable of" under circumstances. Under some circumstances, the term "a device configured to" may mean that the device may be "capable of" with another device or part. For example, "a processor designed (or configured) to execute A, B, and C" may mean a dedicated processor (e.g., an embedded processor) for performing the corresponding operations or a generic-purpose processor (e.g., a CPU or an application processor) for performing the operations by executing one or more software programs stored in a memory device.

An electronic device according to various embodiments of the disclosure may include at least one of, for example, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, mobile medical equipment, a camera, or a wearable device. The wearable device may include at least one of an accessory type (e.g., a watch, a ring, a bracelet, an ankle bracelet, a necklace, glasses, contact lenses, or a head-mounted device (HMD)), a fabric or clothes type (e.g., electronic clothes), a body-attached type (e.g., a skin pad or a tattoo), or an implantable circuit. According to some embodiments, an electronic device may include at least one of, for example, a television, a digital versatile disk (DVD) player, an audio player, a refrigerator, an air conditioner, a vacuum cleaner, an oven, a microwave oven, a washer, an air purifier, a set-top box, a home automation control panel, a security control panel, a media box (e.g., Samsung HomeSync™, Apple TV™, or Google TV™), a game console (e.g., Xbox™ or PlayStation™), an electronic dictionary, an electronic key, a camcorder, or an electronic picture frame.

According to other embodiments, an electronic device may include at least one of a medical device (e.g., a portable medical meter (a blood glucose meter, a heart rate meter, a blood pressure meter, a body temperature meter, or the like), a magnetic resonance angiography (MRA) device, a magnetic resonance imaging (MRI) device, a computed tomography (CT) device, an imaging device, an ultrasonic device, or the like), a navigation device, a global navigation satellite system (GNSS), an event data recorder (EDR), a flight data recorder (FDR), an automotive infotainment device, a naval electronic device (e.g., a naval navigation device, a gyrocompass, or the like), an avionic electronic device, a security device, an in-vehicle head unit, an industrial or consumer robot, a drone, an automatic teller's machine (ATM) in a financial facility, a point of sales (POS) device in a shop, or an Internet of things device (e.g., a lighting bulb, various sensors, a sprinkler, a fire alarm, a thermostat, a street lamp, a toaster, sports goods, a hot water tank, a heater, a boiler, or the like). According to some embodiments, an electronic device may include at least one of furniture, part of a building/structure or a vehicle, an electronic board, an electronic signature receiving device, a projector, or various measuring devices (e.g., a water, electricity, gas or electromagnetic wave measuring device). According to various embodiments, an electronic device may be flexible, or one or a combination of two or more of the foregoing devices. An electronic device according to an embodiment of the disclosure is not limited to the foregoing devices. In the disclosure, the term user may refer to a person or device (e.g., artificial intelligence electronic device) that uses an electronic device.

Referring to FIG. 1, an electronic device 101 in a network environment 100 according to various embodiments is described. The electronic device 101 may include a bus 110, a processor 120, a memory 130, an input/output (I/O) interface 150, a display 160, and a communication interface 170. In some embodiments, at least one of the components may be omitted in the electronic device 101 or a component may be added to the electronic device 101. The bus 110 may interconnect the foregoing components 110 to 170, and include a circuit which allows communication (e.g., transmission of control messages or data) between the foregoing components. The processor 120 may include one or more of a CPU, an application processor (AP), or a communication processor (CP). The processor 120 may, for example, execute computation or data processing related to control and/or communication of at least one other component of the electronic device 101.

The memory 130 may include a volatile memory and/or a non-volatile memory. The memory 130 may, for example, store instructions or data related to at least one other component of the electronic device 101. According to an embodiment, the memory 130 may store software and/or a program 140. The program 140 may include, for example, a kernel 141, middleware 143, an application programming interface (API) 145, and/or an application program (or "application") 147. At least a part of the kernel 141, the middleware 143, or the API 145 may be called an operating system (OS). The kernel 141 may control or manage system resources (e.g., the bus 110, the processor 120, or the memory 130) that are used in executing operations or functions implemented in other programs (e.g., the middleware 143, the API 145, or the application programs 147). Also, the kernel 141 may provide an interface for allowing the middleware 143, the API 145, or the application programs 147 to access individual components of the electronic device 101 and control or manage system resources.

The middleware 143 may serve as a medium through which the kernel 141 may communicate with, for example, the API 145 or the application programs 147 to transmit and receive data. Also, the middleware 143 may process one or more task requests received from the application programs 147 according to priority levels. For example, the middleware 143 may assign priority levels for using system resources (e.g., the bus 110, the processor 120, or the memory 130) of the electronic device 101 to at least one of the application programs 147. For example, the middleware 143 may process the one or more task requests according to the priority levels assigned to the at least one application program 147. The API 145 is an interface through which that the application programs 147 control functions provided by, for example, the kernel 141 or the middleware 143. For example, the API 145 may include at least one interface or function (e.g., a command) for file control, window control, video processing, or text control. The I/O interface 150 may output a command or data received from the user or an external device to the other component(s) of the electronic device 101 to the user or the external device, or output a command or data received from the other component(s) of the electronic device 101 to the user or the external device.

The display 160 may include, for example, a liquid crystal display (LCD), a light emitting diode (LED) display, an organic LED (OLED) display, a microelectromechanical systems (MEMS) display, or an electronic paper display. The display 160 may display, for example, various types of content (e.g., text, an image, a video, an icon, and/or a symbol) to the user. The display 160 may include a touch screen and receive, for example, a touch input, a gesture input, a proximity input, or a hovering input through an electronic pen or a user's body part. The communication interface 170 may establish communication, for example, between the electronic device 101 and an external device (e.g., a first external electronic device 102, a second external electronic device 104, or a server 106). For example, the communication interface 170 may be connected to a network 162 by wireless communication or wired communication and communicate with the external device (e.g., the second external electronic device 104 or the server 106) over the network 162.

The wireless communication may include cellular communication using, for example, at least one of long-term evolution (LTE), LTE-Advance (LTE-A), code division multiple access (CDMA), wideband CDMA (WCDMA), universal mobile telecommunication system (UMTS), Wireless Broadband (WiBro), or global system for mobile communications (GSM). According to an embodiment, the wireless communication may include, for example, at least one of wireless fidelity (WiFi), Bluetooth, Bluetooth low power (BLE), Zigbee, near field communication (NFC), magnetic secure transmission, radio frequency (RF) communication, or body area network (BAN). According to an embodiment, the wireless communication may include global navigation satellite system (GNSS). GNSS may be, for example, global positioning system (GPS), global navigation satellite system (Glonass), Beidou navigation satellite system (hereinafter, referred to as "Beidou"), or Galileo, the European global satellite-based navigation system. In the disclosure, the terms "GPS" and "GNSS" are interchangeably used with each other. The wired communication may include, for example, at least one of universal serial bus (USB), high definition multimedia interface (HDMI), recommended standard 232 (RS-232), power line communication, or plain old telephone service (POTS). The network 162 may be a telecommunication network, for example, at least one of a computer network (e.g., LAN or WAN), the Internet, or a telephone network.

Each of the first and second external electronic devices 102 and 104 may be of the same type as or a different type from the electronic device 101. According to various embodiments, all or a part of operations performed in the electronic device 101 may be performed in one or more other electronic devices (e.g., the electronic devices 102 and 104) or the server 106. According to an embodiment, if the electronic device 101 is to perform a function or a service automatically or upon request, the electronic device 101 may request at least a part of functions related to the function or the service to another device (e.g., the electronic device 102 or 104 or the server 106), instead of performing the function or the service autonomously, or additionally. The other electronic device (e.g., the electronic device 102 or 104 or the server 106) may execute the requested function or an additional function, and provide a result of the function execution to the electronic device 101. The electronic device 101 may provide the requested function or service based on the received result or by additionally processing the received result. For this purpose, for example, cloud computing, distributed computing, or client-server computing may be used.

Figure 2:
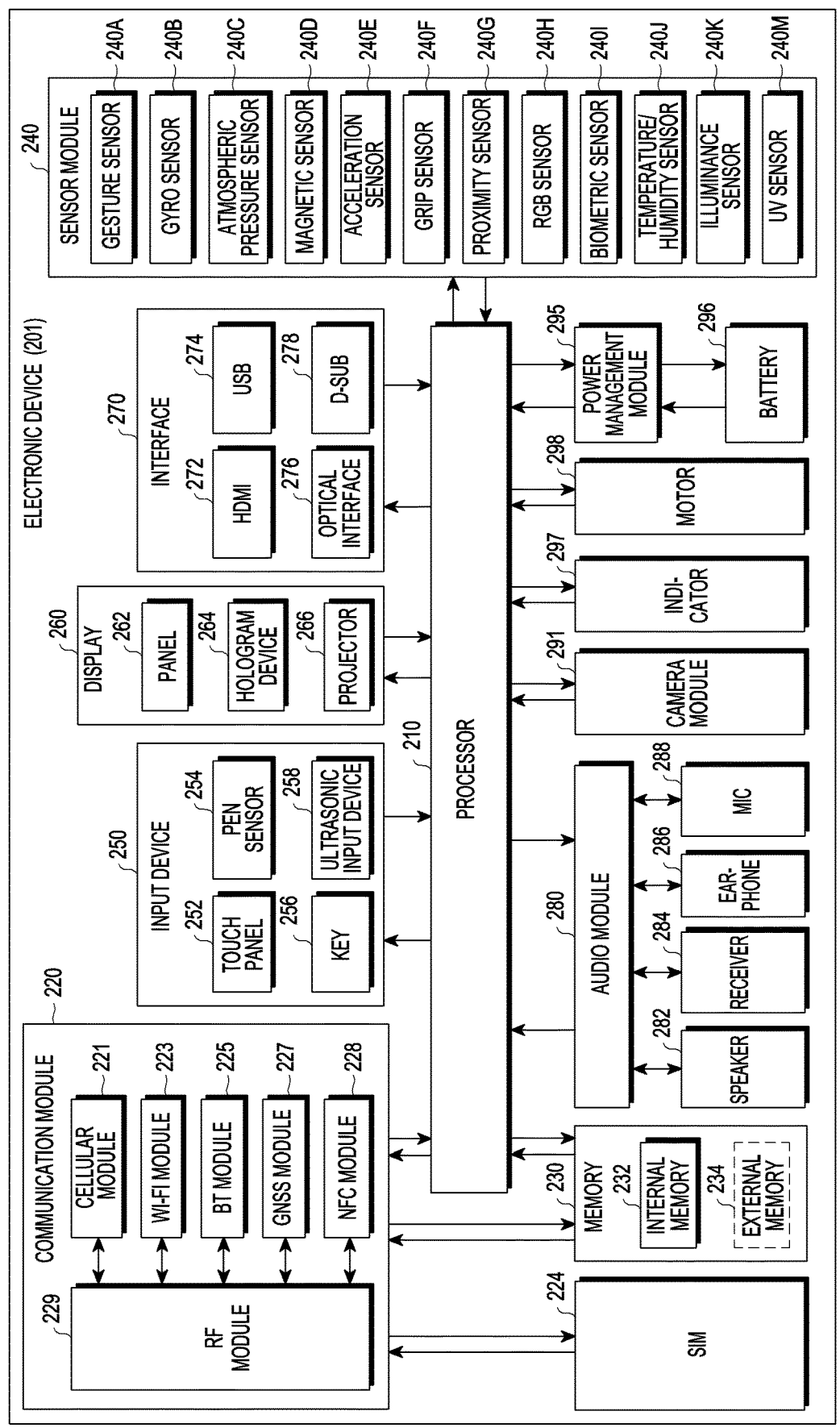
FIG. 2 is a block diagram of an electronic device according to various embodiments.

FIG. 2 is a block diagram of an electronic device 201 according to various embodiments. The electronic device 201 may include, for example, the whole or part of the electronic device 101 illustrated in FIG. 1. The electronic device 201 may include at least one processor (e.g., AP) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 may, for example, control a plurality of hardware or software components which are connected to the processor 210 by executing an OS or an application program, and may perform processing of various types of data or computations. The processor 210 may be implemented, for example, as a system on chip (SoC). According to an embodiment, the processor 210 may further include a graphic processing unit (GPU) and/or an image signal processor. The processor 210 may include at least a part (e.g., a cellular module 221) of the components illustrated in FIG. 2. The processor 210 may load a command or data received from at least one of other components (e.g., a non-volatile memory), process the loaded command or data, and store various types of data in the non-volatile memory.

The communication module 220 may have the same configuration as or a similar configuration to the communication interface 170 illustrated in FIG. 1. The communication module 220 may include, for example, the cellular module 221, a WiFi module 223, a Bluetooth module 225, a GNSS module 227, an NFC module 228, and an RF module 229. The cellular module 221 may provide services such as voice call, video call, text service, or the Internet service, for example, through a communication network. According to an embodiment, the cellular module 221 may identify and authenticate the electronic device 201 within a communication network, using the SIM (e.g., a SIM card) 224. According to an embodiment, the cellular module 221 may perform at least a part of the functions of the processor 210. According to an embodiment, the cellular module 221 may include a CP. According to an embodiment, at least a part (e.g., two or more) of the cellular module 221, the WiFi module 223, the Bluetooth module 225, the GNSS module 227, or the NFC module 228 may be included in a single integrated chip (IC) or IC package. The RF module 229 may transmit and receive, for example, communication signals (e.g., RF signals). The RF module 229 may include, for example, a transceiver, a power amplifier module (PAM), a frequency filter, a low noise amplifier (LNA), an antenna, or the like. According to another embodiment, at least one of the cellular module 221, the WiFi module 223, the Bluetooth module 225, the GNSS module 227, or the NFC module 228 may transmit and receive RF signals via a separate RF module. The SIM 224 may include, for example, a card including the SIM or an embedded SIM. The SIM 224 may include a unique identifier (e.g., integrated circuit card identifier (ICCID)) or subscriber information (e.g., international mobile subscriber identity (IMSI)).

The memory 230 (e.g., the memory 130) may include, for example, an internal memory 232 or an external memory 234. The internal memory 232 may be at least one of, for example, a volatile memory (e.g., dynamic RAM (DRAM), static RAM (SRAM), or synchronous dynamic RAM (SDRAM)), and a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory, a hard drive, or a solid state driver (SSD). The external memory 234 may further include a flash drive such as a compact flash (CF) drive, a secure digital (SD), a micro secure digital (Micro-SD), a mini secure digital (Mini-SD), an extreme digital (xD), a multi-media card (MMC), or a memory stick. The external memory 234 may be operatively or physically coupled to the electronic device 201 via various interfaces.

The sensor module 240 may, for example, measure physical quantities or detect operational states of the electronic device 201, and convert the measured or detected information into electric signals. The sensor module 240 may include at least one of, for example, a gesture sensor 240A, a gyro sensor 240B, an atmospheric pressure sensor 240C, a magnetic sensor 240D, an accelerometer sensor 240E, a grip sensor 240F, a proximity sensor 240G, a color sensor (e.g., a red, green, blue (RGB) sensor) 240H, a biometric sensor 240I, a temperature/humidity sensor 240J, an illuminance sensor 240K, or an ultra violet (UV) sensor 240M. Additionally or alternatively, the sensor module 240 may include, for example, an e-nose sensor, an electromyogram (EMG) sensor, an electroencephaloeram (EEG) sensor, an electrocardiogram (ECG) sensor, an infrared (IR) sensor, an iris sensor, and/or a finger print sensor. The sensor module 240 may further include a control circuit for controlling one or more sensors included therein. According to some embodiments, the electronic device 201 may further include a processor configured to control the sensor module 240, as a part of or separately from the processor 210. Thus, while the processor 210 is in a sleep state, the control circuit may control the sensor module 240.

The input device 250 may include, for example, a touch panel 252, a (digital) pen sensor 254, a key 256, or an ultrasonic input device 258. The touch panel 252 may operate in at least one of, for example, a capacitive, resistive, infrared, or ultrasonic scheme. The touch panel 252 may further include a control circuit. The touch panel 252 may further include a tactile layer, to thereby provide haptic feedback to the user. The (digital) pen sensor 254 may include, for example, a detection sheet which is a part of the touch panel or configured separately from the touch panel.

The key 256 may include, for example, a physical button, an optical key, or a keypad. The ultrasonic input device 258 may sense ultrasonic signals generated by an input tool through a microphone (e.g., a microphone 288), and identify data corresponding to the sensed ultrasonic signals.

The display 260 (e.g., the display 160) may include a panel 262, a hologram device 264, a projector 266, and/or a control circuit for controlling these components. The panel 262 may be configured to be, for example, flexible, transparent, or wearable. The panel 262 and the touch panel 252 may be implemented into one or more modules. According to an embodiment, the panel 262 may include a pressure sensor (or force sensor) for measuring the intensity of pressure of a user touch. The pressure sensor may be integrated into the touch panel 252 or configured as one or more sensors separately from the touch panel 252. The hologram device 264 may utilize the interference of light waves to provide a three-dimensional image in empty space. The projector 266 may display an image by projecting light on a screen. The screen may be positioned, for example, inside or outside the electronic device 201. The interface 270 may include, for example, an HDMI 272, a USB 274, an optical interface 276, or a D-subminiature (D-sub) 278. The interface 270 may be included, for example, in the communication interface 170 illustrated in FIG. 1. Additionally or alternatively, the interface 270 may include, for example, a mobile high-definition link (MHL) interface, an SD card/multi-media card (MMC) interface, or an infrared data association (IrDA) interface.

The audio module 280 may, for example, convert a sound to an electrical signal, and vice versa. At least a part of the components of the audio module 280 may be included, for example, in the I/O interface 150 illustrated in FIG. 1. The audio module 280 may process sound information input into, or output from, for example, a speaker 282, a receiver 284, an earphone 286, or the microphone 288. The camera module 291 may capture, for example, still images and a video. According to an embodiment, the camera module 291 may include one or more image sensors (e.g., a front sensor or a rear sensor), a lens, an image signal processor (ISP), or a flash (e.g., an LED or a xenon lamp). The power management module 295 may manage power of, for example, the electronic device 201. According to an embodiment, the power management module 295 may include a power management integrated circuit (PMIC), a charger IC, or a battery or fuel gauge. The PMIC may adopt wired and/or wireless charging. The wireless charging may be performed, for example, in a magnetic resonance scheme, a magnetic induction scheme, or an electromagnetic wave scheme, and may further include an additional circuit for wireless charging, for example, a coil loop, a resonance circuit, or a rectifier. The battery gauge may measure, for example, a charge level, a voltage while charging, current, or temperature of the battery 296. The battery 296 may include, for example, a rechargeable battery and/or a solar battery.

The indicator 297 may indicate specific states of the electronic device 201 or a part of the electronic device 201 (e.g., the processor 210), for example, boot status, message status, or charge status. The motor 298 may convert an electrical signal into a mechanical vibration, and generate vibrations or a haptic effect. The electronic device 201 may include a processing device for supporting mobile TV (e.g., a GPU). The processing device for supporting mobile TV may process media data compliant with, for example, digital multimedia broadcasting (DMB), digital video broadcasting (DVB), or mediaFlo™. Each of the above-described components of the electronic device may include one or more parts, and the name of the component may vary with the type of the electronic device. According to various embodiments, some component may be omitted from or added to the electronic device (e.g., the electronic device 201). Or one entity may be configured by combining a part of the components of the electronic device, to thereby perform the same functions of the components prior to the combination.

Figure 3:
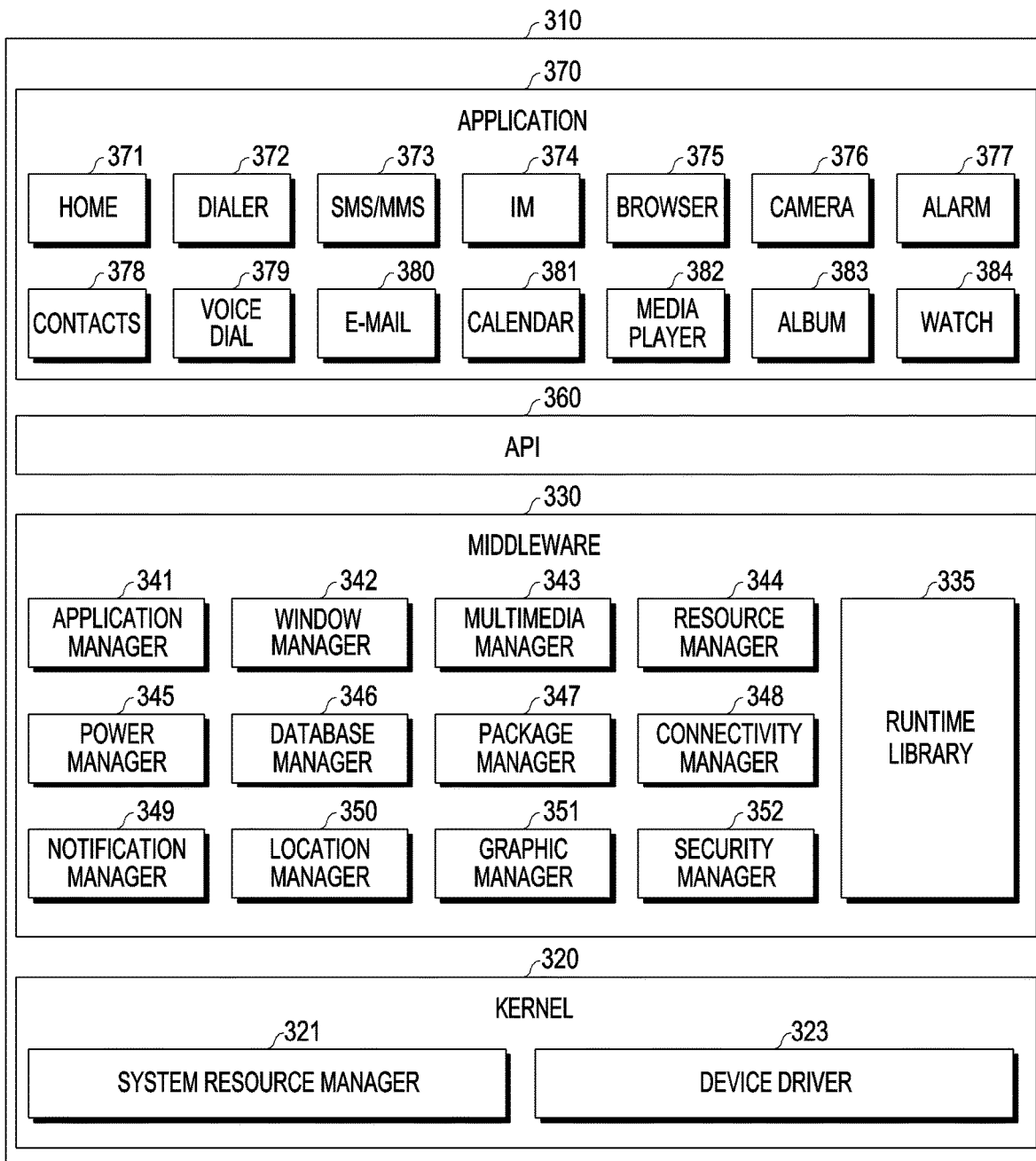
FIG. 3 is a block diagram of a programming module according to various embodiments.

FIG. 3 is a block diagram of a programming module according to various embodiments. According to an embodiment, a programming module 310 (e.g., the program 140) may include an OS that controls resources related to an electronic device (e.g., the electronic device 101) and/or various applications (e.g., the application programs 147) executed on the OS. For example, the OS may be Android™, iOS™, Windows, Symbian™, Tizen™, or Bada™. Referring to FIG. 3, the programming module 310 may include a kernel 320 (e.g., the kernel 141), middleware 330 (e.g., the middleware 143), an API 360 (e.g., the API 145), and/or applications 370 (e.g., the application programs 147). At least a part of the programming module 310 may be preloaded on the electronic device or downloaded from an external electronic device (e.g., the electronic device 102 or 104, or the server 106).

The kernel 320 may include, for example, a system resource manager 321 and/or a device driver 323. The system resource manager 321 may control, allocate, or deallocate system resources. According to an embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a WiFi driver, an audio driver, or an inter-process communication IPC) driver. The middleware 330 may, for example, provide a function required commonly for the applications 370 or provide various functions to the applications 370 through the API 360 so that the applications 370 may efficiently use limited system resources available within the electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include, for example, a library module that a complier uses to add a new function in a programming language during execution of an application 370. The runtime library 335 may perform input/output management, memory management, a function related to arithmetic function, or the like. The application manager 341 may manage, for example, the life cycle of the applications 370. The window manager 342 may manage GUI resources used for a screen. The multimedia manager 343 may determine formats required to play back various media files, and may encode or decode a media file using a CODEC suitable for the format of the media file. The resource manager 344 may manage source codes of the applications 370, or a memory space. The power manager 345 may, for example, manage a battery capacity or a power source, and may provide power information required for an operation of the electronic device. According to an embodiment, the power manager 345 may operate in conjunction with a basic input/output system (BIOS). The database manager 346 may generate, search, or modify a database for the applications 370. The package manager 347 may manage installation or update of an application distributed as a package file.

The connectivity manager 348 may manage, for example, wireless connectivity. The notification manager 349 may provide an event such as message arrival, a schedule, a proximity alarm, or the like to a user. The location manager 350 may mange, for example, position information about the electronic device. The graphic manager 351 may manage graphical effects to be provided to the user or related user interfaces. The security manager 352 may provide, for example, system security or user authentication. According to an embodiment, the middleware 330 may include a telephony manager to manage a voice or video call function of the electronic device, or a middleware module that combines various functions of the above-described components. According to an embodiment, the middleware 330 may provide a customized module for each OS type. The middleware 330 may dynamically delete a part of the existing components or add a new component. The API 360 is, for example, a set of API programming functions, which may be configured differently according to an OS. For example, in the case of Android or iOS, one API set may be provided per platform, whereas in the case of Tizen, two or more API sets may be provided per platform.

The applications 370 may include applications such as home 371, dialer 372, short message service/multimedia messaging service (SMS/MMS) 373, instant message (IM) 374, browser 375, camera 376, alarm 377, contacts 378, voice dial 379, email 380, calendar 381, media player 382, album 383, or watch 384, health care (e.g., measurement of an exercise amount or a glucose level), or providing of environment information (e.g., information about atmospheric pressure, humidity, or temperature). According to an embodiment, the applications 370 may include an information exchange application supporting information exchange between the electronic device and an external electronic device. The information exchange application may include, for example, a notification relay application for transmitting specific information to the external electronic device or a device management application for managing the external electronic device. For example, the notification relay application may include a function of transmitting notification information generated from another application to the external electronic device. Also, the notification relay application may receive notification information from the external electronic device and transmit the received notification information to a user. The device management application may, for example, install, delete, or update functions of the external electronic device communicating with the electronic device (e.g., turn-on/turn-off of the external electronic device (or a part of its components) or control of the brightness (or resolution) of the display)), or an application executed in the external electronic device. According to an embodiment, the applications 370 may include an application (e.g., a health care application of mobile medical equipment) designated according to a property of the external electronic device. According to an embodiment, the applications 370 may include an application received from an external electronic device. At least a part of the programming module 310 may be configured (e.g., implemented) in software, firmware, hardware (e.g., the processor 210), or a combination of at least two of them. At least a part of the programming module 310 may include a module, a program, a routine, a set of instructions, or a process to execute one or more functions.

The term "module" as used herein may include its ordinary meaning including a hardware, software, or firmware unit. The term "module" may be used interchangeably with terms such as logic, logical block, component or circuit. A "module" may be the smallest unit of an integrated part or a portion thereof. A "module" may be the smallest unit for performing one or more functions, or a portion thereof. A "module" may be implemented mechanically, or electronically. For example, a "module" may include at least one of a known, or to-be-developed, application-specific integrated circuit (ASIC) chip, field-programmable gate arrays (FPGAs), or programmable logic devices that perform certain operations. At least a part of apparatuses (e.g., modules or their functions) or methods (e.g., operations) according to various embodiments may be implemented as commands stored in a computer-readable storage medium (e.g., the memory 130), in the form of a programming module. When the commands are executed by a processor (e.g., the processor 120, the processor may execute functions corresponding to the commands. The computer-readable medium may include hard disk, floppy disk, magnetic media (e.g., magnetic tape), optical media (e.g., compact disc read-only memory (CD-ROM), digital versatile disc (DVD), magneto-optical media (e.g., floptical disk), internal memory, and the like. Program instructions may include machine language code that is produced by a compiler or high-level language code that may be executed by an interpreter. A module or a programming module according to various embodiments may include one or more of the above-described components, may omit a portion thereof, or may include additional components. Operations that are performed by a module, a programming module or other components according to various embodiments may be processed in a serial, parallel, repetitive or heuristic manner. Also, some operations may be performed in a different order or omitted, or additional operations may be added.

For the convenience of description, the term user motion may be used to conceptually cover a user's pose, movement, shape, gesture, and/or status in the present disclosure.

Figure 4A:
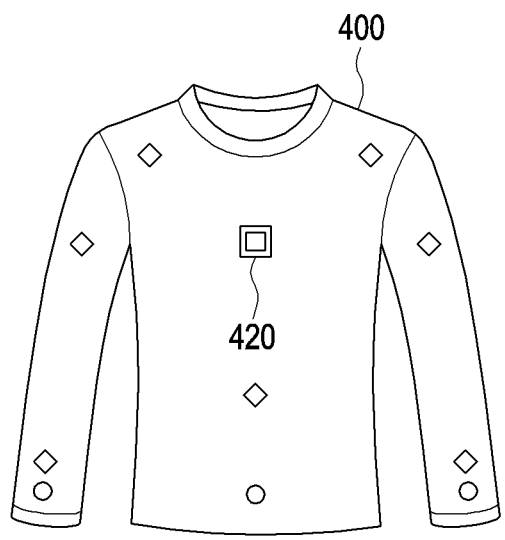
FIG. 4 is a schematic block diagram of an electronic device according to various embodiments of the present disclosure.
Figure 4B:
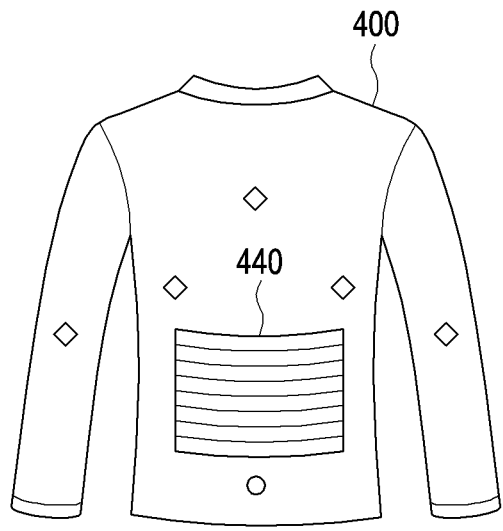

FIG. 4 is a schematic block diagram of an electronic device according to various embodiments of the present disclosure.

Referring to FIG. 4, an electronic device 400 may include a plurality of energy harvesters 415, a processor 420, a plurality of sensors 430, and a battery 440. The electronic device 400 may further include wires (not shown) that interconnect the components 415, 420, 430, and 440. The electronic device 400 may further include a power management module (not shown) that manages the power of a wearable electronic device.

The electronic device 400 may be implemented as a wearable electronic device. For example, the electronic device 400 may be implemented as smart clothes, a smart accessory (e.g., shoes, socks, gloves, or a hat), or any other smart device.

While the wearable electronic device will be described below in the context of smart clothes for the convenience of description, the technical spirit of the present disclosure is not limited thereto. Meanwhile, referring to FIG. 4, (a) of FIG. 4 illustrates the front of smart clothes, and (b) of FIG. 4 illustrates the back of the smart clothes.

The plurality of energy harvesters 415 may generate electrical energy on the basis of a motion with respect to the wearable electronic device, or a change in the shape of the wearable electronic device.

For example, the plurality of energy harvesters 415 may generate electrical energy from kinetic energy, solar energy, thermal energy, wind energy, pressure energy, and/or a salinity gradient.

For example, the plurality of energy harvesters 415 may generate electricity by using a the pressure difference caused by bending, applied pressure, motion-incurred frictional electrification, solar heat, solar light, and/or body heat.

The processor 420 may control the plurality of sensors 430. For example, the processor 420 may be configured as a low-power processor.

According to some embodiments, the processor 420 may receive sensor data about a user motion from at least one of the plurality of sensors 430. In addition, the processor 420 may determine a user activity corresponding to the user motion by using the received sensor data.

For example, the power management module (not shown) may refer to a module that manages the power of the wearable electronic device 400. For example, the power management module may manage the plurality of energy harvesters 415. The power management module may be configured as, for example, a power manager integrated circuit (PMIC).

Meanwhile, the processor 420 may include the power management module. Then, the processor 420 may control the plurality of energy harvesters 415 by using the power management module.

While the electronic device 400 is shown as including a single processor in FIG. 4, for the convenience of description, the technical spirit of the present disclosure is not limited thereto. Rather, the electronic device 400 may include a plurality of processors. Further, each of the plurality of processors may control a plurality of energy harvesters and/or a plurality of sensors.

The plurality of sensors 430 may sense user motion. Each of the sensors 430 may be positioned in a part that facilitates collecting data corresponding to user motion.

According to some embodiments, the plurality of sensors 430 may determine a user's pose, movement, shape, gesture, and status.

For example, the plurality of sensors 430 may include an accelerometer, a gyroscope, a geomagnetic sensor, a barometer, a stretch sensor, and/or a piezoelectric sensor.

According to some embodiments, the accelerometer and the gyroscope may be positioned in parts that facilitate determining the user's pose (e.g., parts having large motion displacements). For example, the accelerometer and the gyroscope may be positioned in parts corresponding to the body, arms, or wrists of a person.

Further, the stretch sensor and the piezoelectric sensor may be positioned in parts of the clothes that are folded most frequently. For example, the stretch sensor and the piezoelectric sensor may be positioned in parts corresponding to the elbows, waist, back, and/or armpits.

The battery 440 may store electrical energy. For example, the battery 440 may store electrical energy generated from the plurality of energy harvesters 415. Further, the battery 440 may receive electrical energy wiredly and/or wirelessly from an external power supply (not shown); and store the received electrical energy.

For example, the battery 440 may be formed of a bendable material (e.g., fabric) or a less irritating material.

Meanwhile, the positions and numbers of the plurality of energy harvesters 415, the processor 420, the plurality of sensors 430, and the battery 440 illustrated in FIG. 4 are given for the convenience of description, and thus should not be construed as limiting the technical spirit of the present disclosure.

Figure 5:
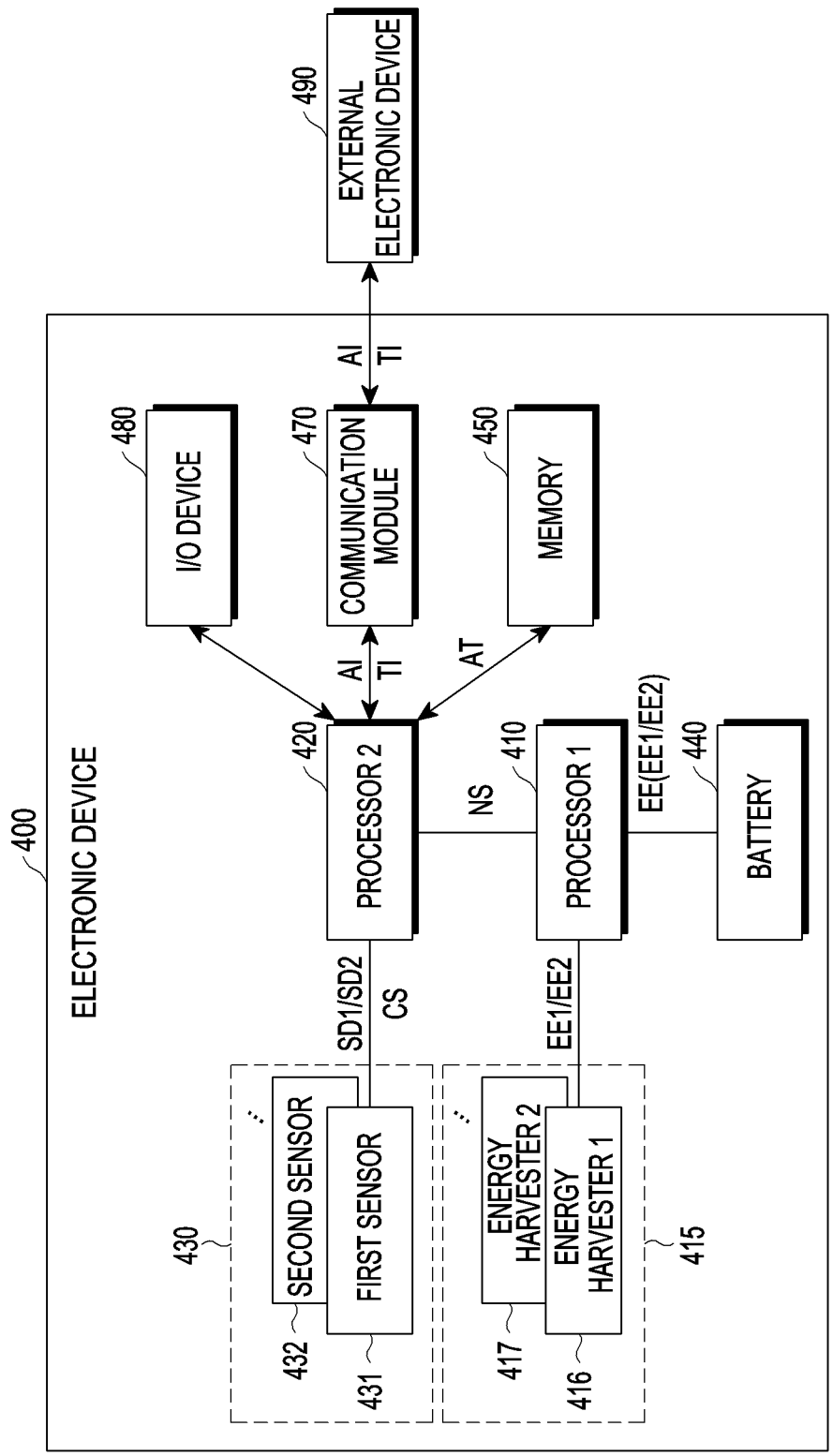
FIG. 5 is a detailed block diagram of the electronic device illustrated in FIG. 4.

FIG. 5 is a detailed block diagram of the electronic device illustrated in FIG. 4.

Referring to FIGS. 4 and 5, the electronic device 400 may include a first processor 410, the plurality of energy harvesters 415, a second processor 420, the plurality of sensors 430, the battery 440, a memory 450, a communication module 470, and an I/O device 480.

The first processor 410 may control the plurality of energy harvesters 415. The first processor 410 may also control the battery 440.

The first processor 410 may obtain electrical energy (e.g., EE1 and EE2) generated from the respective energy harvesters 415. Further, the first processor 410 may store electrical energy EE in the battery 440 by using the electrical energy EE1 and EE2 generated from the respective energy harvesters 415.

For example, the first processor 410 may include a power management module. Herein, the first processor 410 may include a PMIC.

According to some embodiments, the first processor 410 may activate the second processor 420. For example, if the electrical energy (e.g., EE1 and EE2) generated from the plurality of energy harvesters 415 satisfies a predetermined first condition, the first processor 410 may transmit, to the second processor 420, a notification signal (NS) for activating the second processor 420.

The first condition may be a condition en of the electrical energy (e.g., EE1 and EE2) with respect to a predetermined power amount. For example, if the electrical energy (e.g., EE1 and EE2) is equal to or less than the predetermined power amount, it may be determined that there is no need for sensing user motion through the plurality of sensors 430, and thus the second processor 420 may not be activated. On the other hand, if the electrical energy (e.g., EE1 and EE2) is equal to or greater than the predetermined power amount, it may be determined that it is necessary to sense user motion through the plurality of sensors 430, and thus the second processor 420 may be activated.

The plurality of energy harvesters 415 may generate the electrical energy EE1 and EE2 on the basis of a motion with respect to the electronic device 400 or a change in the shape of the electronic device 400. In addition, the plurality of energy harvesters 415 may generate electrical energy from solar light, solar heat, and/or body heat.

According to some embodiments, the plurality of energy harvesters 415 may include a first energy harvester 416 and a second energy harvester 417.

The first energy harvester 416 may generate first electrical energy EE1, and the second energy harvester 417 may generate second electrical energy EE2. For example, the first energy harvester 416 may be positioned in a first area of the electronic device 400, and the second energy harvester 417 may be positioned in a second area of the electronic device 400. The first area and the second area may be identical or different.

The second processor 420 may control the plurality of sensors 430.

According to some embodiments, the second processor 420 may transition to an active state in response to an NS received from the first processor 410.

For example, if the second processor 420 is in an inactive state, the second processor 420 may transition from the inactive state to the active state in response to the NS.

If the second processor 420 transitions to the active state, the second processor 420 may activate or deactivate at least one of the plurality of sensors 430. For example, the second processor 420 may transmit a control signal (CS) for activating at least one of the plurality of sensors 430 to the at least one sensor 430. Herein, the CS may include an interrupt signal for activating (or waking up) at least one of the plurality of sensors 430. Further, the CS may include a signal for deactivating at least one of the plurality of sensors 430.

According to some embodiments, the second processor 420 may acquire first sensor data SD1 from a first sensor 431 among the plurality of sensors 430.

The second processor 420 may selectively acquire second sensor data SD2 from a second sensor 432 among the plurality of sensors 430. For example, if the first sensor data SD1 satisfies a predetermined second condition, the second processor 420 may acquire the second sensor data SD2. On the other hand, if the first sensor data SD1 does not satisfy the predetermined second condition, the second processor 420 may not acquire the second sensor data SD2. Further, if the first sensor data SD1 does not satisfy the predetermined second condition, the second processor 420 may acquire the second sensor data SD2 in every predetermined period.

For example, if the first sensor data SD1 satisfies the predetermined second condition, the second processor 420 may acquire the second sensor data SD2 in every first period. On the other hand, if the first sensor data SD1 does not satisfy the predetermined second condition, the second processor 420 may acquire the second sensor data SD2 in every predetermined second period. The first period may be shorter or longer than the second period.

The second condition may be a condition of whether the first sensor data SD1 is sufficient to determine a user activity corresponding to a motion with respect to the electronic device 400. For example, if the first sensor data SD1 is sufficient to determine the user activity, the second processor 420 may not acquire the second sensor data SD2. On the other hand, if the first sensor data SD1 is not sufficient to determine the user activity, the second processor 420 may acquire the second sensor data SD2.

Further, if the first energy harvester 416 has generated the first electrical energy EE1, the second processor 420 may selectively acquire the second sensor data SD2. For example, if the first area in which the first energy harvester 416 is located is identical to the position of the second sensor 432, the second processor 420 may acquire the second sensor data SD2. On the other hand, if the first area in which the first energy harvester 416 is located is different from the position of the second sensor 432, the second processor 420 may not acquire the second sensor data SD2.

The second processor 420 may determine a user activity corresponding to a motion with respect to the electronic device 400 by using at least one of the first sensor data SD1 or the second sensor data SD2. For example, the second processor 420 may determine a user activity by comparing at least one of the first sensor data SD1 or the second sensor data SD2 with an activity table AT stored in the memory 450.

According to some embodiments, the second processor 420 may determine a user activity corresponding to a motion with respect to the electronic device 400 by using the first sensor data SD1.

The second processor 420 may determine whether the determined activity satisfies a predetermined third condition, and selectively acquire the second sensor data SD2 according to the result of the determination. For example, if the determined activity satisfies the predetermined third condition, the second processor 420 may acquire the second sensor data SD2. On the other hand, if the determined activity does not satisfy the predetermined third condition, the second processor 420 may not acquire the second sensor data SD2. Further, if the determined activity satisfies the predetermined third condition, the second processor 420 may acquire the second sensor data SD2 in every predetermined period.

For example, if the determined activity satisfies the predetermined third condition, the second processor 420 may acquire the second sensor data SD2 in every third period. On the other hand, if the determined activity does not satisfy the predetermined third condition, the second processor 420 may acquire the second sensor data SD2 in every fourth period. The third period may be shorter or longer than the fourth period.

The third condition may be a condition of whether the first sensor data SD1 is sufficient for the second processor 420 to determine a user activity. For example, if the first sensor data SD1 is sufficient to determine the user activity, the second processor 420 may not acquire the second sensor data SD2. On the other hand, if the first sensor data SD1 is not sufficient to determine the user activity, the second processor 420 may acquire the second sensor data SD2.

The second processor 420 may determine the user activity, and generate information (AI) about the user activity.

The plurality of sensors 430 may sense a (user's) motion with respect to the electronic device 400. In addition, the plurality of sensors 430 may generate sensor data (e.g., SD1 and SD2) about the motion with respect to the electronic device 400.

According to some embodiments, the plurality of sensors 430 may include the first sensor 431 and the second sensor 432.

The first sensor 431 may generate the first sensor data SD1, and the second sensor 432 may generate the second sensor data SD2. For example, the first sensor 431 may be disposed at a first position of the electronic device 400, and the second sensor 432 may be disposed at a second position of the electronic device 400. Herein, the first position and the second position may be identical or different. In addition, the first sensor 431 and the second sensor 432 may be configured as the same sensor or different sensors.

The battery 440 may store the electrical energy EE generated from the plurality of energy harvesters 415 under the control of the first processor 410. Further, the battery 440 may store electrical energy received from the outside under the control of the first processor 410.

The memory 450 may store sensor data (e.g., SD1 and SD2) acquired from the plurality of sensors under the control of the second processor 420. Further, the memory 450 may store the activity table AT. Meanwhile, the memory 450 may store the predetermined first, second, and third conditions.

The memory 450 may be configured as a non-volatile memory. For example, the memory 450 may be configured as a flash memory.

While only the second processor 420, and the plurality of energy harvesters 415 and plurality of sensors corresponding to the second processor 420, are shown in FIG. 5, for the convenience of description, the technical spirit of the present disclosure is not limited thereto. Rather, the electronic device 400 may include a plurality of processors, and a plurality of energy harvesters and plurality of sensors which correspond to the plurality of processors.

According to some embodiments, the electronic device 400 may further include another processor in addition to the second processor 420. For example, the electronic device 400 may further include a third processor. The third processor may control a third sensor and a third energy harvester.

According to some embodiments, the third processor may acquire third electrical energy from the third energy harvester. The third processor may activate the third sensor by the third electrical energy. Further, the third processor may transmit the third electrical energy to the first processor 410 or the second processor 420.

According to some embodiments, the third processor may acquire third sensor data from the third sensor, and transmit the third sensor data to the second processor 420. Further, the third processor may determine a user motion with respect to the electronic device 400 by using the third sensor data.

Meanwhile, the third processor may be located in the same area as or a different area from that of the second processor 430. For example, if the second processor 420 is located in the body area of the smart clothes, the third processor may be located in one of both arm portions of the smart clothes.

The third sensor may sense a motion with respect to the electronic device 400 under the control of the third processor. Further, the third sensor may generate third sensor data about the sensed motion, and transmit the third sensor data to the third processor.

The communication module 470 may be connected to an external electronic device 490 by wireless communication technology and/or a wired communication technology. For example, the communication module 470 may include a Wi-Fi module, a Bluetooth module, a radio frequency identification (RFID) module, a Zigbee module, and/or an NFC module.

The communication module 470 may transmit activity information AI to the external electronic device 490 under the control of the second processor 420. Further, the communication module 470 may transmit the first sensor data SD1, the second sensor data SD2, and the third sensor data SD3 to the external electronic device 490 under the control of the second processor 420.

Meanwhile, the communication module 470 may transmit type information TI about the connected external electronic device 490. The type information TI may include information about the type, features, and/or category of the external electronic device 490. For example, the type information TI may include information indicating whether the external electronic device 490 is a smartphone or a smart TV.

According to some embodiments, the second processor 420 may determine whether to acquire the second sensor data SD2 on the basis of the type information TI about the external electronic device 490.

For example, if the type of the external electronic device 490 is a device used outdoors (e.g., smartphone), the second processor 420 may acquire the second sensor data SD2. Further, if the type of the external electronic device 490 is a device used indoors (e.g., smart TV), the second processor 420 may not acquire the second sensor data SD2.

The I/O device 480 may include an input device and an output device.

For example, if the electronic device 400 is smart clothes, the input device may receive a touch input through the fabric of the smart clothes. Further, the input device may include a button on a clothes button, and may receive an input through the button. Further, the input device may receive a voice input or a sound input through a microphone.

For example, the output device may provide feedback to the user by using a light emitting device included in the wearable electronic device. Further, the output device may provide voice feedback or sound feedback to the user through a speaker.

The external electronic device 490 may receive activity information AI from the electronic device 400, and provide the activity information AI to the user. For example, if the external electronic device 490 includes a display, the external electronic device 490 may display the activity information AI.

Further, the external electronic device 490 may receive the sensor data SD1, SD2, and/or SD3 from the electronic device 400. Further, the external electronic device 490 may store the received sensor data SD1, SD2, and/or SD3.

For example, the external electronic device 490 may be configured as a smartphone, a wearable electronic device, a smart TV, a PC, a laptop computer, a server, a smart device, and/or a computing device.

Figure 6A:
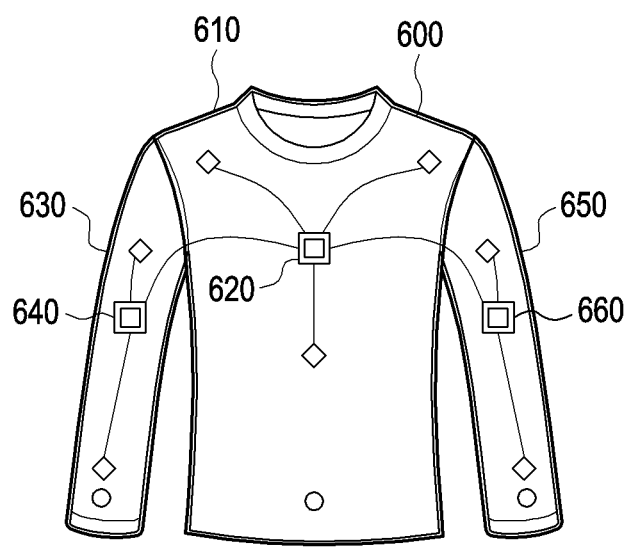
FIG. 6 is a schematic block diagram of an electronic device according to various embodiments of the present disclosure.
Figure 6B:
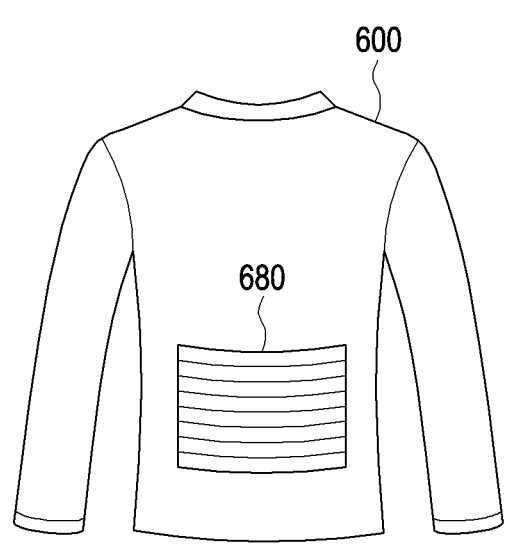

FIG. 6 is a schematic block diagram of an electronic device according to various embodiments of the present disclosure.

Referring to FIG. 6, an electronic device 600 may include a plurality of energy harvesters, a plurality of processors 620, 640 and 660, a plurality of sensors, and a battery 680. The electronic device 600 may further include wires (not shown) that interconnect the components.

The electronic device 600 illustrated in FIG. 6 may be configured to be substantially the same as or similar to the electronic device 400 illustrated in FIG. 4, except for the plurality of processors 620, 640 and 660.

While the following description is given on the assumption that the electronic device 600 is smart clothes, for the convenience of description, the technical spirit of the present disclosure is not limited thereto. Meanwhile, referring to FIG. 6, (a) of FIG. 6 illustrates the front of the smart clothes, and (b) of FIG. 6 illustrates the back of the smart clothes.

Each of the plurality of processors 620, 640 and 660 may control at least one of the plurality of sensors.

According to some embodiments, each of the plurality of processors 620, 640 and 660 may receive sensor data about a user motion from at least one of the plurality of sensors 430. Further, each of the plurality of processors 620, 640 and 660 may determine a user activity corresponding to the user motion by using the received sensor data. Among the plurality of processors 620, 640 and 660, a main processor (e.g., 620) may receive all sensor data, and determine a user activity by using the received sensor data.

Meanwhile, each of the plurality of processors 620, 640 and 660 may include a power management module. Herein, each of the plurality of processors 620, 640 and 660 may control the plurality of energy harvesters by using the power management module.

According to some embodiments, the plurality of processors may include a fourth processor 620, a fifth processor 640, and a sixth processor 660.

The fourth processor 620 may control first energy harvesters from among the plurality of energy harvesters, and first sensors from among the plurality of sensors. The fifth processor 640 may control second energy harvesters from among the plurality of energy harvesters, and second sensors from among the plurality of sensors. The third processor 660 may control third energy harvesters from among the plurality of energy harvesters, and third sensors from among the plurality of sensors.

For example, the fourth processor 620, the first energy harvesters, and the first sensors may be located in a first area 610, the fifth processor 640, the second energy harvesters, and the second sensors may be located in a second area 630, and the sixth processor 660, the third energy harvesters, and the third sensors may be located in a third area 650. The first area 610, the second area 630, and the third area 650 may be at the same or different positions. For example, the first area 610 may be disposed on the body of the smart clothes, the second area 630 may be disposed on the right arm of the smart clothes, and the third area 650 may be disposed on the left arm of the smart clothes.

The plurality of energy harvesters may generate electrical energy on the basis of a motion with respect to the wearable electronic device, or a change in the shape of the wearable electronic device. Each of the plurality of energy harvesters may be positioned in a part that facilitates generating electrical energy corresponding to a user motion or a shape change.

The plurality of sensors may sense a user motion. Each of the sensors may be positioned in a part that facilitates collecting data corresponding to a user motion.

The battery 680 may store electrical energy. For example, the battery 680 may store electrical energy generated from the plurality of energy harvesters. Further, the battery 680 may receive electrical energy wiredly and/or wirelessly from an external power supply (not shown) and store the received electrical energy.

Meanwhile, the positions and numbers of the plurality of the energy harvesters, the plurality of processors 620, 640 and 660, the plurality of sensors, and the battery 680 illustrated in FIG. 6 are given for the convenience of description, and thus should not be construed as limiting the technical spirit of the present disclosure.

Figure 7:
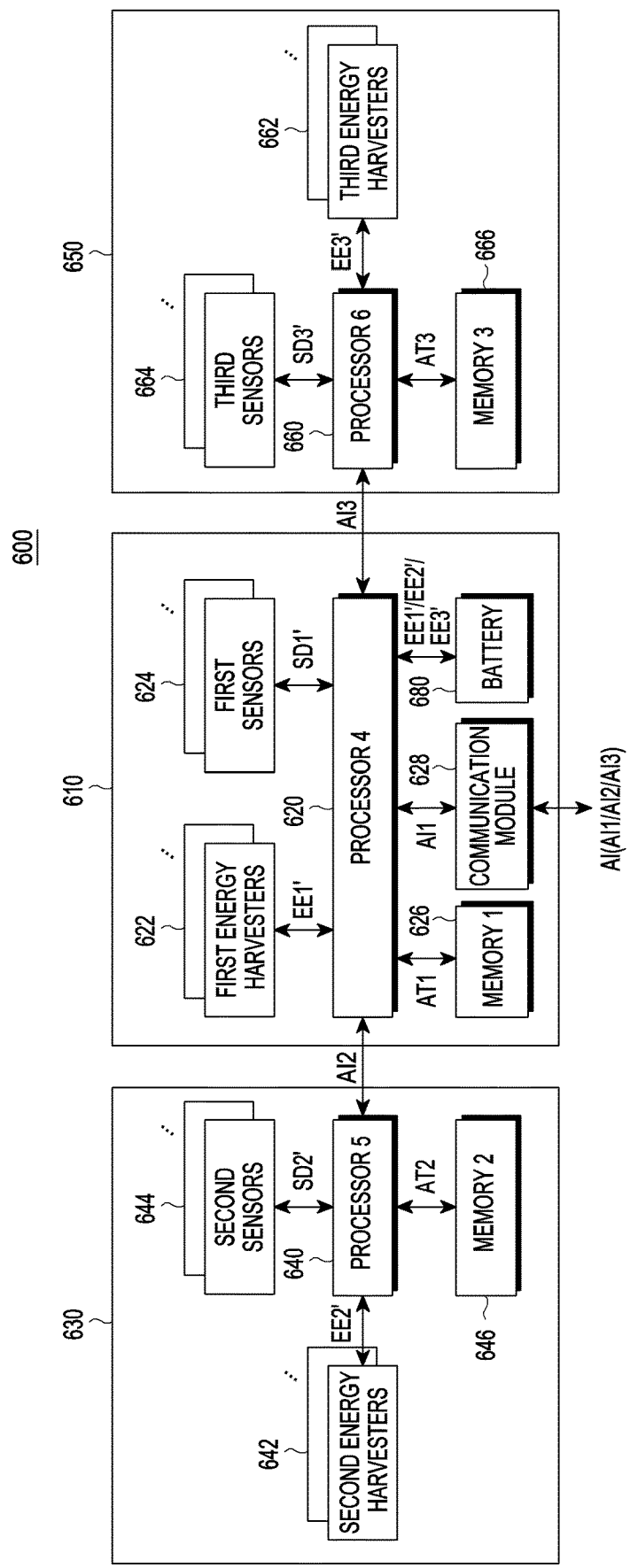
FIG. 7 is a detailed block diagram of the electronic device illustrated in FIG. 6.

FIG. 7 is a detailed block diagram of the electronic device illustrated in FIG. 6.

Referring to FIGS. 6 and 7, the electronic device 600 may include the first area 610, the second area 630, and the third area 650.

According to some embodiments, for example, the first area 610 may be disposed on the body of the smart clothes, the second area 630 may be disposed on the right arm of the smart clothes, and the third area 650 may be disposed on the left arm of the smart clothes.

Meanwhile, while the following description is given on the assumption that a processor located in the first area is the main processor, the technical spirit of the present disclosure is not limited thereto.

The first area 610 may include the fourth processor 620, first energy harvesters 622, first sensors 624, a first memory 626, a communication module 628, and the battery 680.

The fourth processor 620 may provide overall control to the components 622, 624, 626, 628, and 680 in the first area 610.

The fourth processor 620 may acquire electrical energy EE1' generated from each of the first energy harvesters 622.

The fourth processor 620 may activate at least one of the first sensors 624 by the first electrical energy EE1'. Further, the fourth processor 620 may store the first electrical energy EE1' in the battery 680.

Meanwhile, the fourth processor 620 may acquire second electrical energy EE2' and third electrical energy EE3' generated from the second area 630 and the third area 650, respectively. The fourth processor 620 may store the second electrical energy EE2' and the third electrical energy EE3' in the battery 680.

The first energy harvesters 622 may generate the first electrical energy EE1' on the basis of a motion with respect to the first area 610 or a change in the shape of the first area 610 of the electronic device 600. Further, the first energy harvesters 622 may generate the first electrical energy EE1' from solar light, solar heat, and/or body heat.

The fourth processor 620 may acquire first sensor data SD1' from at least one of the first sensors 624.

The fourth processor 620 may determine a user activity corresponding to the motion with respect to the first area 610 by using the first sensor data SD1'. For example, the fourth processor 620 may determine a user activity by comparing the first sensor data SD1' with a first activity table AT1 stored in the memory 626. The first activity table AT1 may be configured to be identical or similar to the activity table described with reference to FIG. 5.

The fourth processor 620 may determine the user activity, and generate activity information AI1 about the user activity.

According to some embodiments, the fourth processor 620 may transmit the first information AI1 about the user activity to an external electronic device through the communication module 628.

Meanwhile, the fourth processor 620 may acquire second information AI2 and third information AI3 about the user activity, generated in the second area 630 and third area 650, respectively. Herein, the fourth processor 620 may transmit, to an external electronic device, the second information AI2 and the third information AI3 about the user activity, generated in the second area 630 and the third area 650, respectively, through the communication module 628.

According to some embodiments, the fourth processor 620 may generate information AI about the user activity by using the first information AI1, the second information AI2, and the third information AI3. Further, the fourth processor 620 may transmit the information AI about the user activity to the external electronic device through the communication module 628.

The second area 630 may include the fifth processor 640, second energy harvesters 642, second sensors 644, and a second memory 646.

The fifth processor 640 may provide overall control to the components 642, 644, and 646 in the second area 630.

The fifth processor 640 may acquire second electrical energy EE2' generated from each of the second energy harvesters 642.

The fifth processor 640 may activate at least one of the second sensors 644 by the second electrical energy EE2'. Further, the fifth processor 640 may store the second electrical energy EE2' in a battery (not shown).

Meanwhile, the fifth processor 640 may transmit the second electrical energy EE2' to the first area 630. Further, the fifth processor 640 may transmit the second electrical energy EE2' to the third area 650.

The second energy harvesters 642 may generate the second electrical energy EE2' on the basis of a motion with respect to the second area 630 or a change in the shape of the second area 630 of the electronic device 600. Further, the second energy harvesters 642 may generate the second electrical energy EE2' from solar light, solar heat, and/or body heat.

The fifth processor 640 may acquire second sensor data SD2' from at least one of the second sensors 644.

The fifth processor 640 may determine a user activity corresponding to a motion with respect to the second area 630 by using the second sensor data SD2'. For example, the fifth processor 640 may determine a user activity by comparing the second sensor data SD2' with a second activity table AT2 stored in the memory 646. The second activity table AT2 may be configured to be identical or similar to the first activity table AT1.

The fifth processor 640 may determine the user activity, and generate activity information AI2 about the user activity.

According to some embodiments, the fifth processor 640 may transmit the second information AI2 to the fourth processor 620 of the first area 610.

The third area 650 may include the sixth processor 660, third energy harvesters 662, third sensors 664, and a third memory 666.

The sixth processor 660 may provide overall control to the components 662, 664, and 666 in the third area 650.

The sixth processor 660 may acquire third electrical energy EE3' generated from each of the third energy harvesters 662.

The sixth processor 660 may activate at least one of the third sensors 664 by the third electrical energy EE3'. Further, the sixth processor 660 may store the third electrical energy EE3' in a battery (not shown).

Meanwhile, the sixth processor 660 may transmit the third electrical energy EE3' to the first area 610. Further, the sixth processor 660 may transmit the third electrical energy EE3' to the second area 630.

The third energy harvesters 662 may generate the third electrical energy EE3' on the basis of a motion with respect to the third area 650 or a change in the shape of the third area 650 of the electronic device 600. Further, the third energy harvesters 662 may generate the third electrical energy EE3' from solar light, solar heat, and/or body heat.

The sixth processor 660 may acquire third sensor data SD3' from at least one of the third sensors 664.

The sixth processor 660 may determine a user activity corresponding to the motion with respect to the third area 650 by using the third sensor data SD3'. For example, the sixth processor 660 may determine a user activity by comparing the third sensor data SD3' with a third activity table AT3 stored in the memory 666. The third activity table AT3 may be configured to be identical or similar to the first activity table AT1.

The sixth processor 660 may determine the user activity, and generate activity information AI3 about the user activity.

According to some embodiments, the sixth processor 660 may transmit the third information AI3 to the fourth processor 620 of the first area 610.

Figure 8:
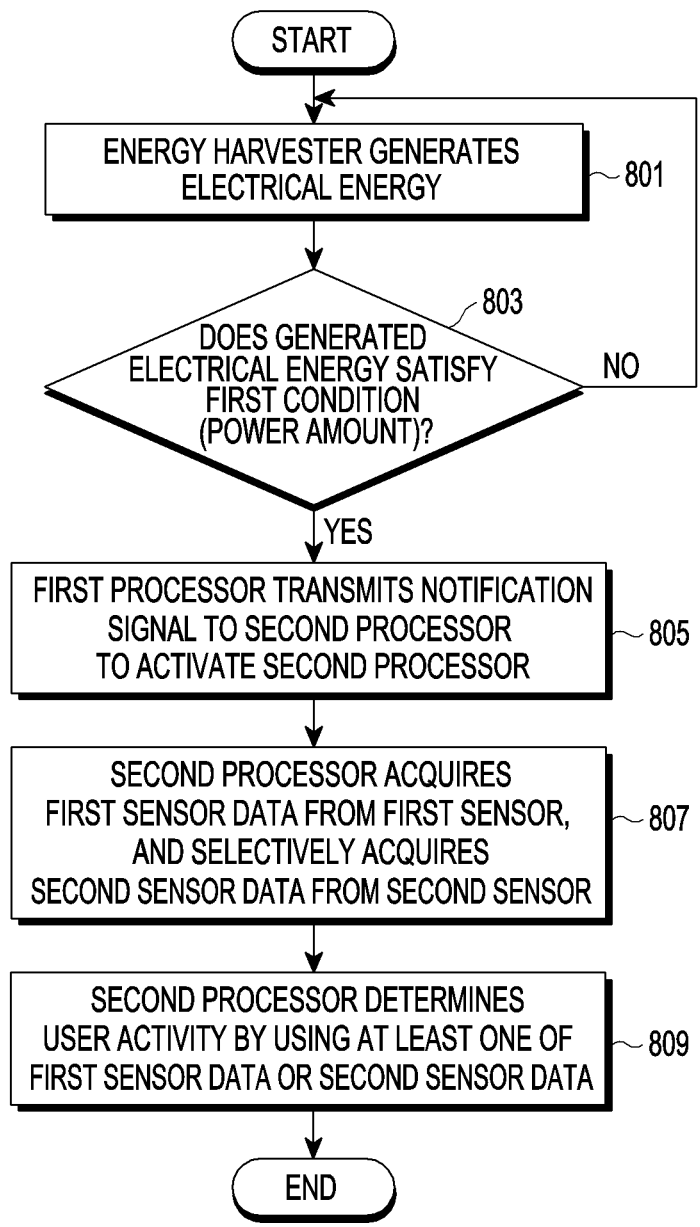
FIG. 8 is a flowchart illustrating a method of operating an electronic device according to various embodiments of the present disclosure.

FIG. 8 is a flowchart illustrating a method of operating an electronic device according to various embodiments of the present disclosure.

Referring to FIG. 8, the plurality of energy harvesters 415 may generate electrical energy on the basis of a motion with respect to the electronic device 400 or a change in the shape of the electronic device 400 in operation 801.

In operation 803, the first processor 410 may determine whether the generated electrical energy EE1 and EE2 satisfies a first condition (e.g., a power amount).

According to some embodiments, if the electrical energy EE1 and EE2 is equal to or greater than a predetermined power amount in operation 803, the first processor 410 may transmit an NS to the second processor 420 in order to activate the second processor 420 in operation 805.

On the other hand, if the electrical energy EE1 and EE2 is equal to or greater than the predetermined power amount in operation 803, the first processor 410 may not activate the second processor 420.

In operation 807, the second processor 420 may acquire first sensor data SD1 from the first sensor 431 among the plurality of sensors 430. In addition, the second processor 420 may selectively acquire second sensor data SD2 from the second sensor 432 among the plurality of sensors 430.

In operation 809, the second processor 420 may determine a user activity by using at least one of the first sensor data SD1 or the second sensor data SD2.

Figure 9:
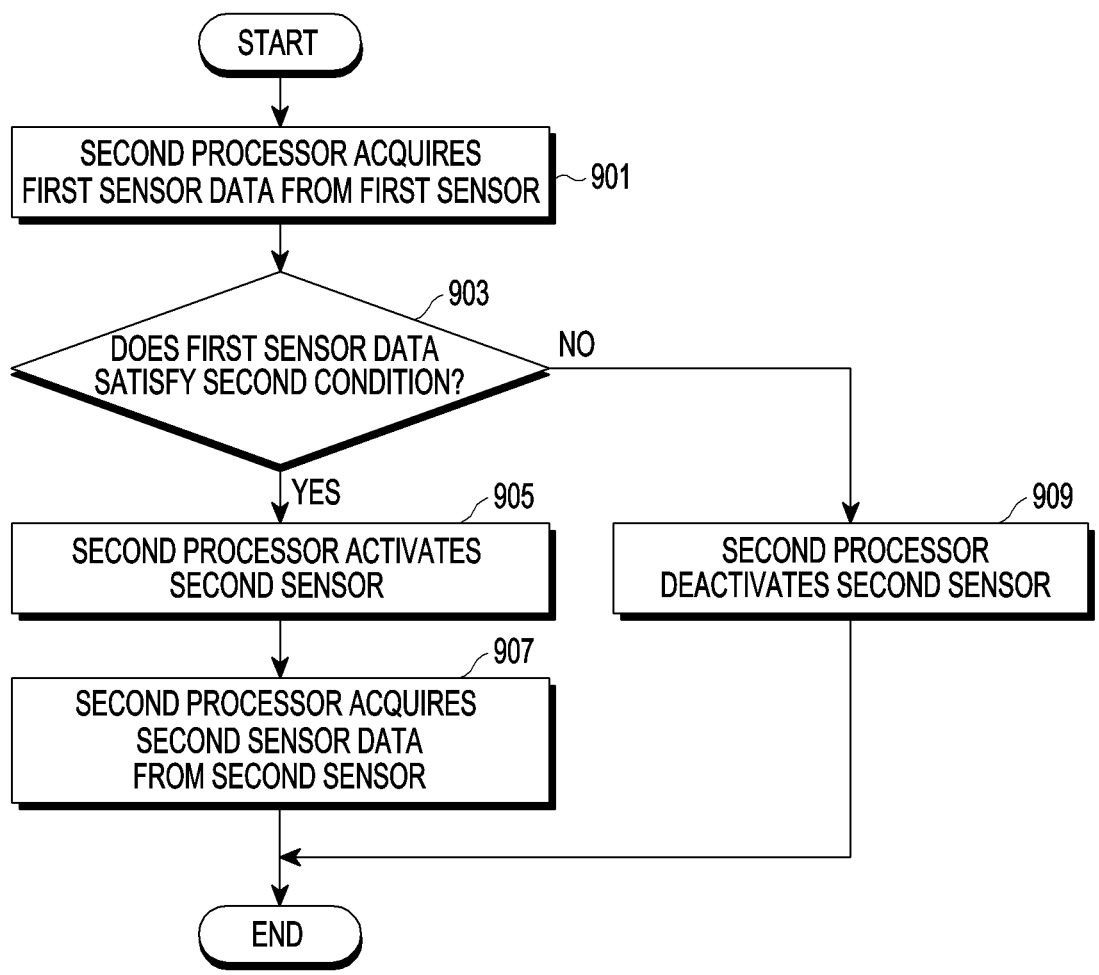
FIG. 9 is a flowchart illustrating a method of operating an electronic device according to various embodiments of the present disclosure.

FIG. 9 is a flowchart illustrating a method of operating an electronic device according to various embodiments of the present disclosure.

Referring to FIG. 9, if the second processor 420 is activated, the second processor 420 may acquire first sensor data SD1 from the first sensor 431 in operation 901.

In operation 903, the second processor 420 may determine whether the first sensor data SD1 satisfies a second condition.

According to some embodiments, if the first sensor data SD1 satisfies the second condition in operation 903, the second processor 420 may activate the second sensor 432 in operation 905.

In operation 907, the second processor 420 may acquire second sensor data SD2 from the second sensor 432. Meanwhile, even though the second sensor 432 is activated, the second processor 420 may selectively acquire the second sensor data SD2 through the second sensor 430.

The second processor 420 may determine a user activity on the basis of at least one of the first sensor data SD1 or the second sensor data SD2.

According to some embodiments, if the first sensor data SD1 does not satisfy the second condition in operation 903, the second processor 420 may deactivate the second sensor 432 in operation 909. Herein, the second processor 420 may determine the user activity on the basis of the first sensor data SD1.

Figure 10:
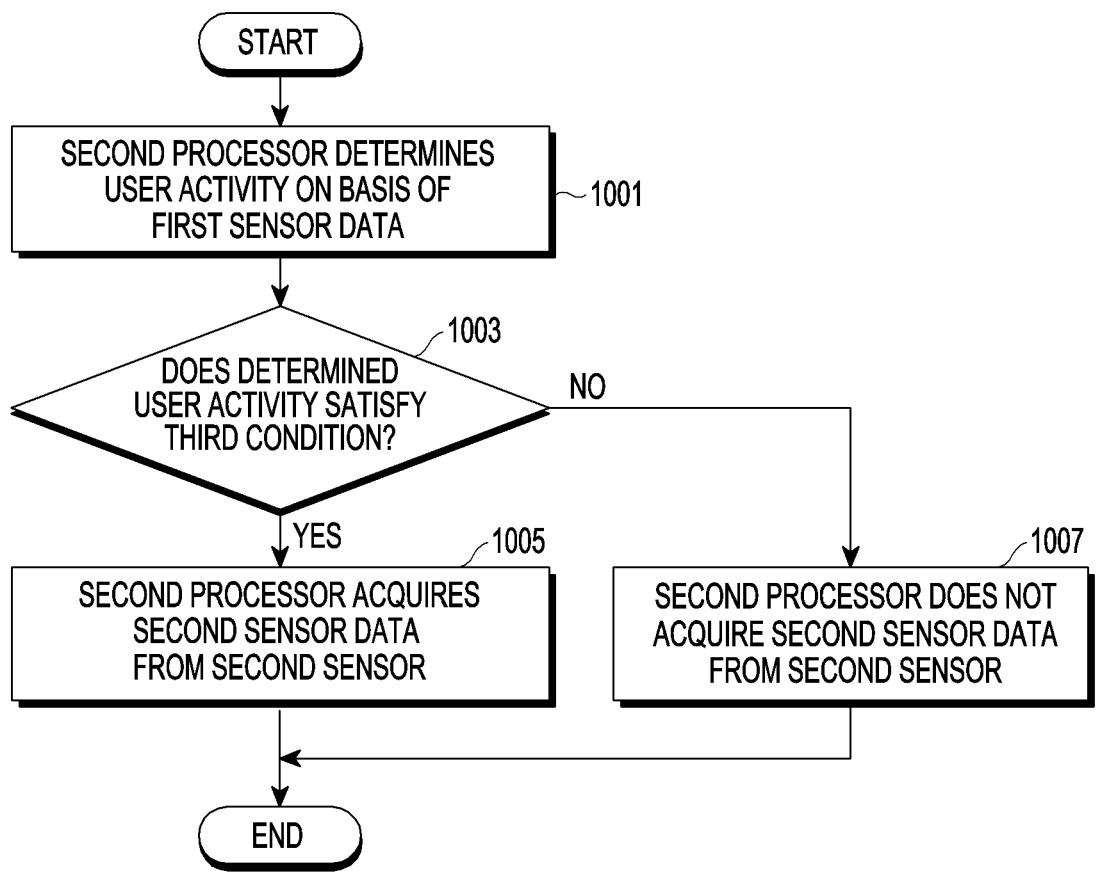
FIG. 10 is a flowchart illustrating a method of operating an electronic device according to various embodiments of the present disclosure.

FIG. 10 is a flowchart illustrating a method of operating an electronic device according to various embodiments of the present disclosure.

Referring to FIG. 10, if the second processor 420 is activated, the second processor 420 may acquire first sensor data SD1 from the first sensor 431.

In operation 1001, the second processor 420 may determine a user activity on the basis of the first sensor data SD1.

In operation 1003, the second processor 420 determines whether the determined user activity satisfies a third condition.

According to some embodiments, if the user activity satisfies the third condition, the second processor 420 may acquire second sensor data SD2 from the second sensor 432 in operation 1005. Herein, the second processor 420 may determine the user activity on the basis of at least one of the first sensor data SD1 or the second sensor data SD2.

If the user activity does not satisfy the third condition, the second processor 420 may not acquire the second sensor data SD2 from the second sensor 432 in operation 1007. Herein, the second processor 420 may determine the user activity on the basis of the first sensor data SD1.

FIG. 11 illustrates an activity table stored in a memory according to an embodiment of the present disclosure.

Referring to FIG. 11, the memory 450 may store an activity table AT of user activities. For example, the second processor 420 may determine a user activity by comparing first sensor data SD1 and second sensor data SD2 with the activity table AT.

According to some embodiments, the activity table AT may list first activities and second activities.

The first activities may include the states of stationary, walking, and running.

For example, stationary may refer to a state in which no movement is made, or a motion is made without movement. Walking may refer to a state in which a movement is made at or above (or above) a first threshold. Running may refer to a state in which a movement is made at or above (or above) a second threshold. The first threshold and the second threshold may mean the velocities or speeds of movements. Further, the second threshold may mean a velocity or speed greater than the first threshold.

The second activities are specific activities classified further from the first activities.

For example, second activities for the stationary state may include no-wear, lying-down, sitting, standing, leaning-back, and in-vehicle. Second activities for walking may include normal walking, power walking, and trekking. Second activities for running may include light running, heavy running, and marathon.

For example, in the stationary state, the second processor 420 may determine that the user activity is no-wear on the basis of the first sensor data SD1. Further, in the movement state in daily life, the second processor 420 may determine that the user activity is normal walking on the basis of at least one of the first sensor data SD1 or the second sensor data SD2. Meanwhile, in a running state at or above a predetermined speed for a predetermined time, the second processor 420 may determine that the user activity is a marathon on the basis of at least one of the first sensor data SD1 or the second sensor data SD2.

FIG. 12 illustrates an activity table stored in a memory according to another embodiment of the present disclosure.

Referring to FIG. 12, the memory 450 may store an activity table AT of user activities. For example, the second processor 420 may determine a user activity by comparing first sensor data SD1 and second sensor data SD2 with the activity table AT.

According to some embodiments, the activity table AT may list first activities and second activities.

The first activities may include the states of sports, fitness, and vehicle.

For example, sports may refer to a state in which there is a characteristic motion during walking and/or running. Fitness may refer to a workout state in a gym (or fitness center). Vehicle refers to a state in which a user is on board any transportation means.

The second activities are specific activities classified further from the first activities.

For example, second activities for sports may include cycling, soccer, basketball, baseball, and swimming. Second activities for fitness may include upper body workout, lower body workout, and upper-lower body workout. Second activities for vehicle may include driving a car and being a passenger.

For example, in the soccer state (in a state where the lower body is mainly used, and kicks or excessive running are irregularly sensed), the second processor 420 may determine that the user activity is soccer on the basis of at least one of the first sensor data SD1 or the second sensor data SD2. Further, in a state where upper body workout is sensed in a sitting state, the second processor 420 may determine that the user activity is upper body workout on the basis of at least one of the first sensor data SD1 or the second sensor data SD2. Meanwhile, in a state where a steering wheel is manipulated in a sitting state, the second processor 420 may determine that the user activity is car driving on the basis of at least one of the first sensor data SD1 or the second sensor data SD2.

Figure 13A:
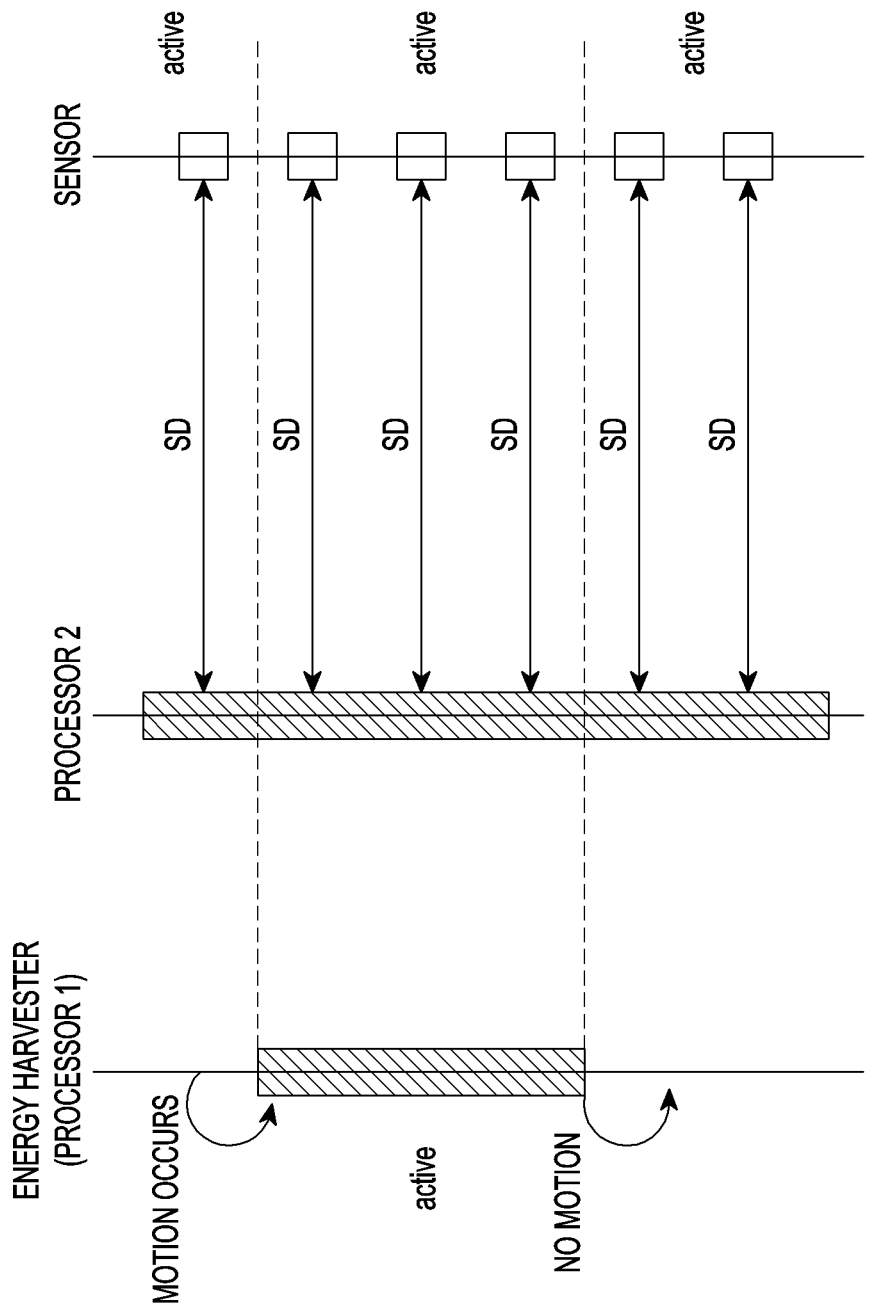
Figure 13B:
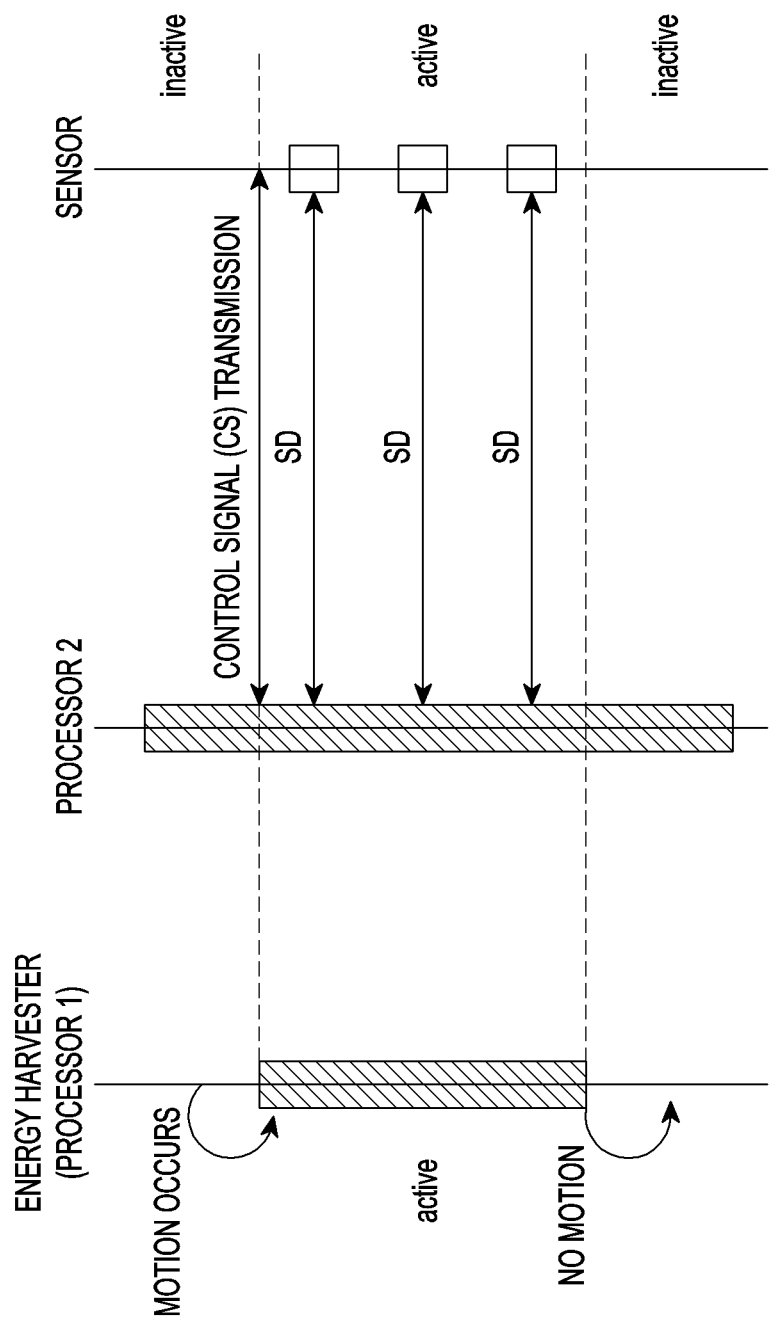

FIGS. 13a, 13b and 13c illustrate data flows for methods of operating an electronic device according to various embodiments of the present disclosure.

FIG. 13a illustrates the data flow for a method of operating an electronic device according to an embodiment of the present disclosure.

Referring to FIG. 13a, if a motion is made, the plurality of energy harvesters 415 may generate electrical energy under the control of the first processor 410.

According to some embodiments, the second processor 420 may be kept active irrespective of the first processor 410. The plurality of sensors 430 may also be kept active irrespective of the first processor 410.

For example, the second processor 420 may acquire sensor data SD in every predetermined period from at least one of the plurality of sensors 430. Further, the second processor 420 may determine a user activity corresponding to a motion with respect to the electronic device 400 by using the acquired sensor data SD. Herein, the second processor 420 may be configured as a low-power processor, and operate with low power.

FIG. 13*b* illustrates the data flow for a method of operating an electronic device according to another embodiment of the present disclosure.

Referring to FIG. 13*b*, if a motion is made, the plurality of energy harvesters 415 may generate electrical energy under the control of the first processor 410. The second processor 420 may activate the plurality of sensors 430 in response to a motion (e.g., electrical energy) sensed from at least one of the plurality of energy harvesters 415.

According to some embodiments, the second processor 420 may be kept active irrespective of the first processor 410. Meanwhile, upon receiving a CS from the second processor 420, the plurality of sensors 430 may be activated. For example, the second processor 420 may transmit the CS to at least one of the plurality of sensors 430 in response to an NS.

Meanwhile, upon receiving sensor data from a sensor that senses a-user motion, the second processor 420 may activate the plurality of sensors 430. For example, upon receiving sensor data from a motion sensor, the second processor 420 may transmit a CS to at least one of the plurality of sensors 430.

For example, if the plurality of sensors 420 are activated, the second processor 420 may acquire sensor data SD in every predetermined period from at least one of the plurality of sensors 430. Further, the second processor 420 may determine a user activity corresponding to the motion with respect to the electronic device 400 by using the acquired sensor data SD.

Meanwhile, the first processor 410 may transmit a signal indicating the absence of a motion to the second processor 420. Then, the second processor 420 may deactivate the plurality of sensors.

FIG. 13*c* illustrates the data flow for a method of operating an electronic device according to another embodiment of the present disclosure.

Referring to FIG. 13*c*, if a motion is made, the plurality of energy harvesters 415 may generate electrical energy under the control of the first processor 410.

According to some embodiments, the second processor 420 may switch (or transition) from the inactive state to the active state in response to an NS received from the first processor 410. Further, upon receiving an NS from the second processor 420, the plurality of sensors 430 may be activated. For example, the second processor 420 may transmit a CS to at least one of the plurality of sensors 430.

For example, if the plurality of sensors 430 are activated, the second processor 420 may acquire sensor data SD in every predetermined period from at least one of the plurality of sensors 430. Further, the second processor 420 may determine a user activity corresponding to the motion with respect to the electronic device 400 by using the acquired sensor data SD.

Meanwhile, the first processor 410 may transmit a signal indicating the absence of motion to the second processor 420. Then, the second processor 420 may deactivate the plurality of sensors.

Figure 14:
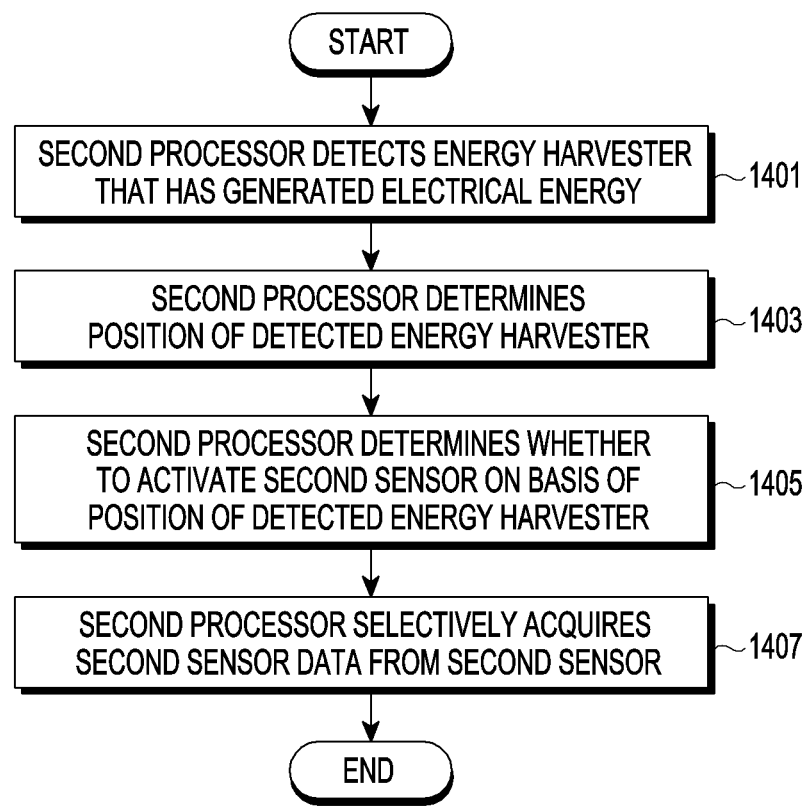
FIG. 14 is a flowchart illustrating a method of operating an electronic device according to various embodiments of the present disclosure.

FIG. 14 is a flowchart illustrating a method of operating an electronic device according to various embodiments of the present disclosure.

Referring to FIG. 14, if the second processor 420 is activated, the second processor 420 may acquire first sensor data SD1 from the first sensor 431.

According to some embodiments, the second processor 420 may detect an energy harvester that has generated electrical energy EE1 or EE2 in operation 1401.

In operation 1403, the second processor 420 may determine the position of the detected energy harvester.

In operation 1405, the second processor 420 may determine whether to activate the second sensor 432 on the basis of the position of the detected energy harvester.

In operation 1407, the second processor 420 may selectively acquire second sensor data SD2 from the second sensor 432 according to the result of the determination.

For example, if the position of the first sensor 431 is different from the position of the energy harvester that has generated the electrical energy, the second processor 420 may activate a sensor near the energy harvester that has generated the electrical energy. If the second sensor 432 is near the energy harvester that has generated the electrical energy, the second processor 420 may activate the second sensor 432, and acquire the second sensor data SD2.

Figure 15:
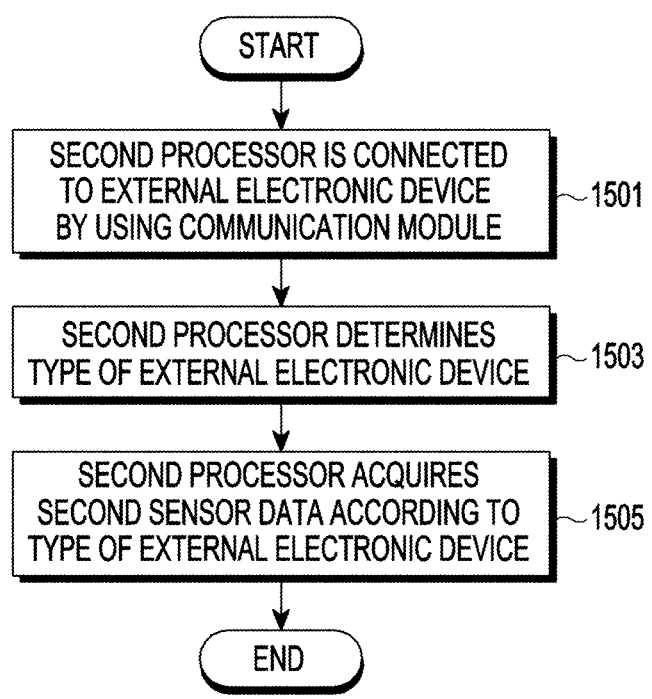
FIG. 15 is a flowchart illustrating a method of operating an electronic device according to various embodiments of the present disclosure.

FIG. 15 is a flowchart illustrating a method of operating an electronic device according to various embodiments of the present disclosure.

Referring to FIG. 15, the second processor 420 may be connected to the external electronic device 490 through the communication module 470 in operation 1501.

According to some embodiments, the second processor 420 may determine the type of the external electronic device 490 in operation 1503. That is, the second processor 420 may receive type information TI from the external electronic device 490 through the communication module 470, and determine the type of the external electronic device 490 by using the type information TI.

In operation 1505, the second processor 420 may acquire first sensor data SD1 and second sensor data SD2 according to the type of the external electronic device 490. For example, if the external electronic device 490 is an outdoor device (e.g., smartphone or fitness device), the second processor 420 may acquire the first sensor data SD1 and the second sensor data SD2, determining that the user is performing an activity. Further, if the external electronic device 490 is an indoor device (e.g., smart TV), the second processor 420 may not acquire the second sensor data SD2, determining that the user is not performing an activity.

According to some embodiments, the second processor 420 may activate at least one of the plurality of sensors 430 according to the type of the external electronic device 490. For example, if the external electronic device 490 is upper-body workout equipment, the second processor 420 may activate sensors positioned in the upper body part from among the plurality of sensors 430, determining that the user is doing upper body exercise. Further, the second processor 420 may activate processors positioned in the upper body part, determining that the user is doing upper body exercise.

Figure 16:
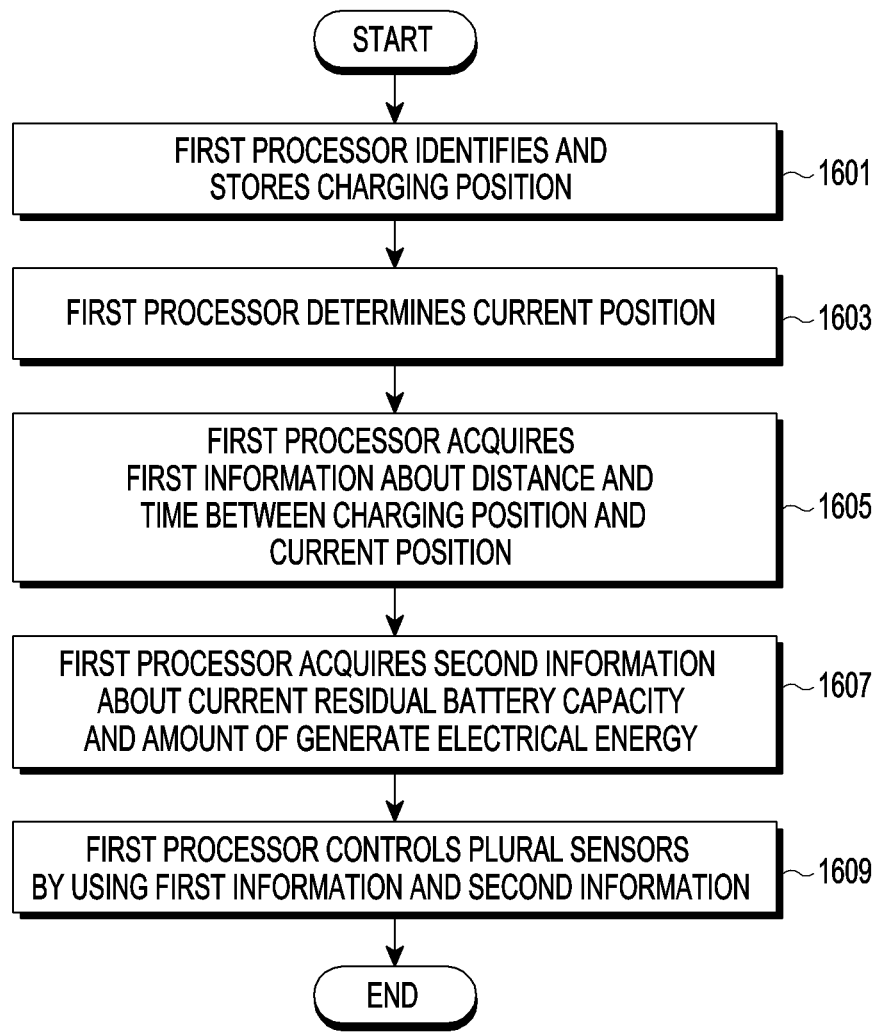
FIG. 16 is a flowchart illustrating a method of operating an electronic device according to various embodiments of the present disclosure.

FIG. 16 is a flowchart illustrating a method of operating an electronic device according to various embodiments of the present disclosure.

Referring to FIG. 16, the first processor 410 may control the power state of the electronic device 400.

According to some embodiments, the first processor 410 may identify a charging position at which the electronic device 400 can be charged, and store information about the charging position in the memory 450 in operation 1601.

In operation 1603, the first processor 410 may determine the current position of the electronic device 400.

In operation 1605, the first processor 410 may acquire first information about the distance and arrival time from the charging position to the current position.

In operation 1607, the first processor 410 may monitor the battery 440, and acquire second information about the current residual capacity of the battery 440 and the amount of electrical energy generated from the plurality of energy harvesters 415.

The first processor 410 may control the plurality of sensors 430 through the second processor 420 by using the first information and the second information. For example, if the current residual battery capacity is insufficient, and the charging position is far from the current position, the first processor 410 may deactivate the second processor 420 and the plurality of sensors 430. On the other hand, if the current residual battery capacity is sufficient, or the charging position is close to the current position, the first processor 410 may activate the second processor 420 and the plurality of sensors 430.

Figure 17:
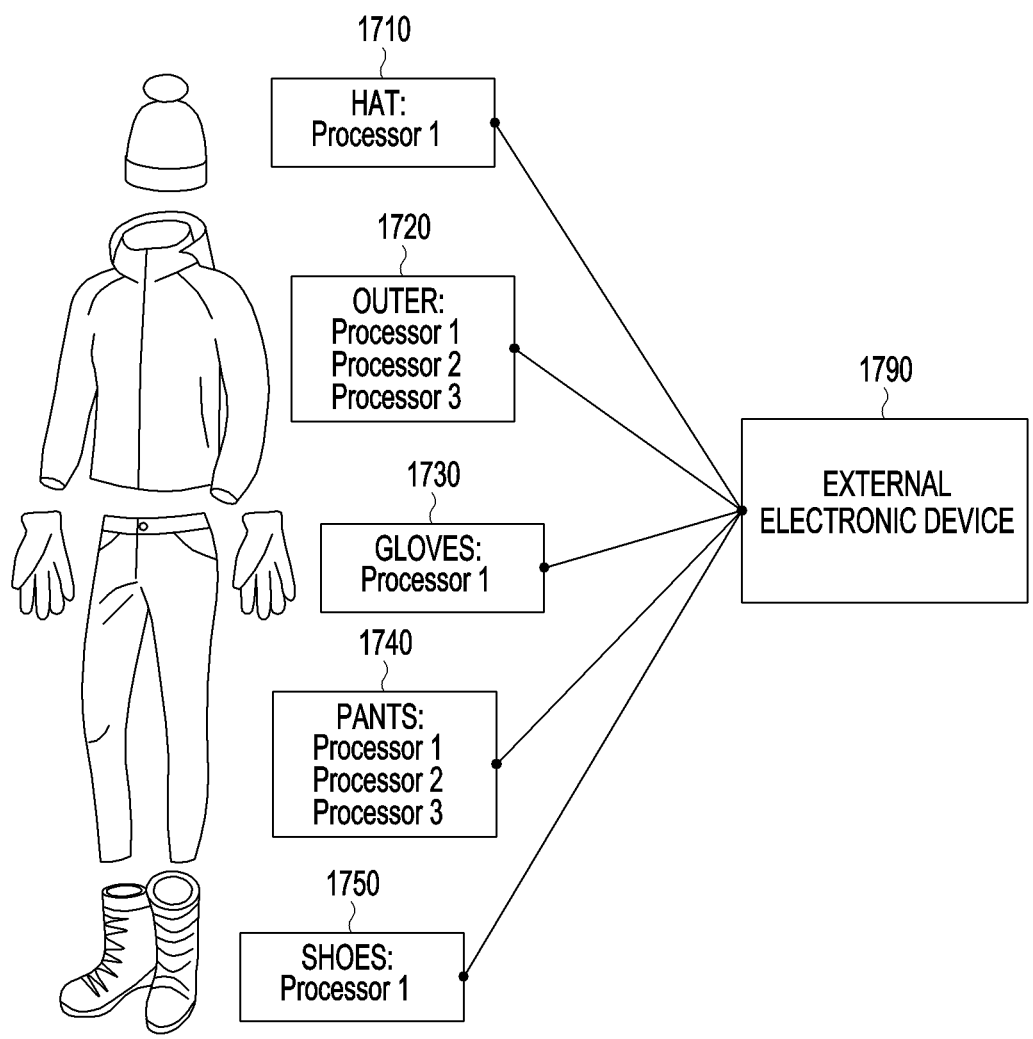
FIG. 17 is a block diagram illustrating a method of operating an electronic system according to various embodiments of the present disclosure.

FIG. 17 is a block diagram illustrating a method of operating an electronic system according to various embodiments of the present disclosure.

Referring to FIG. 17, the electronic system may include a plurality of electronic devices 1710, 1720, 1730, 1740, and 1750, and an external electronic device 1790. Each of the plurality of electronic devices 1710, 1720, 1730, 1740, and 1750 may be configured to be substantially the same as or similar to the electronic device 400 described before with reference to FIG. 4 or the electronic device 600 described before with reference to FIG. 6. Further, the external electronic device 1790 may be configured to be substantially the same as or similar to the external electronic device 490 described before with reference to FIG. 4.

According to some embodiments, each of the plurality of electronic devices 1710, 1720, 1730, 1740, and 1750 may acquire sensor data by using a plurality of sensors. In addition, each of the plurality of electronic devices 1710, 1720, 1730, 1740, and 1750 may transmit the acquired sensor data to the external electronic device 1790.

According to some embodiments, each of the plurality of electronic devices 1710, 1720, 1730, 1740, and 1750 may determine a user activity. Further, each of the plurality of electronic devices 1710, 1720, 1730, 1740, and 1750 may transmit information about the determined user activity to the external electronic device 1790.

The external electronic device 1790 may determine and store information about a more specific behavior or motion of the user by using the acquired sensor data and/or user activity.

Figure 18:
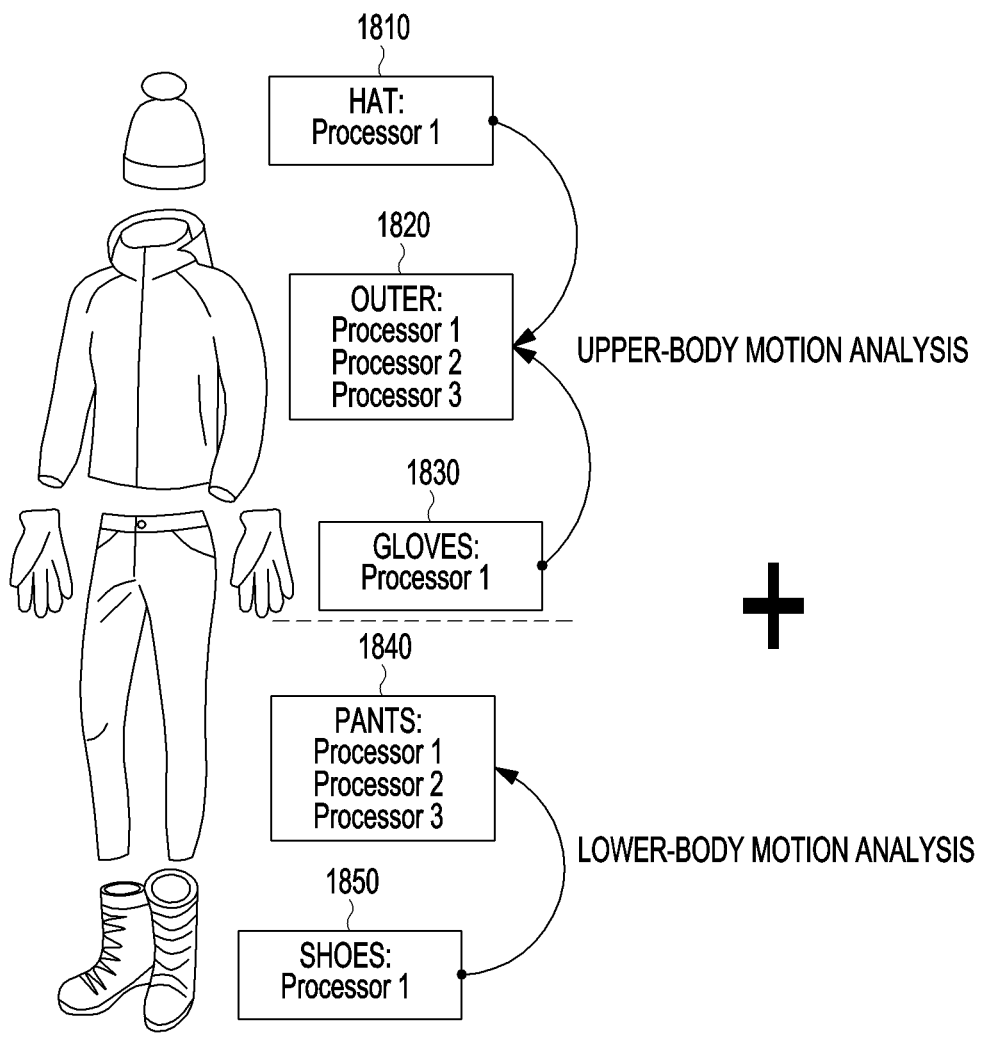
FIG. 18 is a block diagram illustrating a method of operating an electronic system according to various embodiments of the present disclosure.

FIG. 18 is a block diagram illustrating a method of operating an electronic system according to various embodiments of the present disclosure.

Referring to FIG. 18, the electronic system may include a plurality of electronic devices 1810, 1820, 1830, 1840, and 1850. Each of the plurality of electronic devices 1810, 1820, 1830, 1840, and 1850 may be configured to be substantially the same as or similar to the electronic device 400 described before with reference to FIG. 4 or the electronic device 600 described before with reference to FIG. 6.

According to some embodiments, each of the plurality of electronic devices 1810, 1820, 1830, 1840, and 1850 may acquire sensor data by using a plurality of sensors. In addition, each of the plurality of electronic devices 1810, 1820, 1830, 1840, and 1850 may determine a user activity.

At least one main electronic device (e.g., 1820 and 1840 from among the plurality of electronic devices 1810, 1820, 1830, 1840, and 1850) may receive sensor data and/or information about a user activity from each of the plurality of electronic devices 1810, 1820, 1830, 1840, and 1850. The main electronic devices 1820 and 1840 may determine activity information about a more specific behavior or motion of the user by using the sensor data and/or information about the user activity received from each of the plurality of electronic devices 1810, 1820, 1830, 1840, and 1850.

For example, the first main electronic device 1820 may analyze an upper body motion, and the second main electronic device 1840 may analyze a lower body motion. The first main electronic device 1820 or the second main electronic device 1840 may determine a user activity by using the analyzed upper body motion and lower body motion, and generate activity information. In addition, the first main electronic device 1820 or the second main electronic device 1840 may store the generated activity information or transmit the generated activity information to an external electronic device.

According to an embodiment of the present disclosure, a wearable electronic device may include an energy harvester for generating electrical energy on the basis of a motion with respect to the wearable electronic device or a change in the shape of the wearable electronic device, a first processor for controlling the energy harvester, a first sensor, and a second sensor, and a second processor for controlling the first sensor and the second sensor. If the electrical energy generated by the energy harvester satisfies a predetermined first condition, the first processor may be configured to transmit, to the second processor, a control signal for transitioning the second processor to an active state, and if the second processor is transitioned from an inactive state to an active state in response to the control signal, the second processor may be configured to acquire first sensor data from the first sensor, and to selectively acquire second sensor data from the second sensor according to whether the first sensor data satisfies a predetermined second condition.

The second processor may be configured to transition the second sensor to the active state or the inactive state on the basis of the first sensor data.

The energy harvester may include a first energy harvester corresponding to the first sensor, and a second energy harvester corresponding to the second sensor. If the electrical energy is generated by the first energy harvester, the second processor may be configured to selectively acquire the second sensor data.

The first energy harvester may be located in a first area of the wearable electronic device, and the second energy harvester may be located in a second area of the wearable electronic device.

The second processor may be configured to determine a user activity corresponding to the wearable electronic device on the basis of the first sensor data, and to selectively acquire the second sensor data according to whether the user activity satisfies a predetermined third condition.

If the first sensor data satisfies the predetermined second condition, the second processor may be configured to acquire the second sensor data from the second sensor, and if the first sensor data does not satisfy the predetermined second condition, the second processor may be configured to refrain from acquiring the second sensor data from the second sensor.

The wearable electronic device may further include a third processor, and a third sensor corresponding to the third processor, and the third processor may acquire third sensor data from the third sensor.

The second processor may be configured to acquire the third sensor data from the third processor, and to determine a user activity corresponding to the wearable electronic device on the basis of the second sensor data and the third sensor data.

The second processor may be configured to determine a user activity corresponding to the wearable electronic device on the basis of the first sensor data, and to acquire the second sensor data from the second sensor in every one of a first and second periods according to whether the user activity satisfies a predetermined third condition.

The wearable electronic device may further include a communication module, and the second processor may be configured to transmit the first sensor data and the second sensor data to an external electronic device by using the communication module.

The second processor may be configured to determine the type of the external electronic device, to acquire the second sensor data if the external electronic device is of a first type, and to refrain from acquiring the second sensor data if the external electronic device is of a second type different from the first type.

According to an embodiment of the present disclosure, a method of operating a wearable electronic device may include generating electrical energy on the basis of a motion with respect to the wearable electronic device or a change in the shape of the wearable electronic device by an energy harvester, if the electrical energy generated by the energy harvester satisfies a predetermined first condition, transmitting, to a second processor, a control signal for transitioning the second processor to an active state by a first processor, if the second processor is transitioned from an inactive state to an active state in response to the control signal, acquiring first sensor data from a first sensor by the second processor, and selectively acquiring second sensor data from a second sensor by the second processor, according to whether the first sensor data satisfies a predetermined second condition.

The acquisition of second sensor data by the second processor may include transitioning the second sensor to the active state or the inactive state on the basis of the first sensor data.

The energy harvester may include a first energy harvester corresponding to the first sensor, and a second energy harvester corresponding to the second sensor. The acquisition of second sensor data by the second processor may include, if the electrical energy is generated by the first energy harvester, selectively acquiring the second sensor data by the second processor.

The acquisition of second sensor data by the second processor may include determining a user activity corresponding to the wearable electronic device on the basis of the first sensor data, and acquiring the second sensor data according to whether the user activity satisfies a predetermined third condition.

The method may further include acquiring third sensor data from a third sensor corresponding to a third processor by the third processor, and acquiring the third sensor data from the third processor and determining a user activity corresponding to the wearable electronic device on the basis of the second sensor data and the third sensor data by the second processor.

The method may further include determining a user activity corresponding to the wearable electronic device on the basis of the first sensor data, and providing information about the user activity to a user.

The method may further include transmitting the first sensor data and the second sensor data to an external electronic device by using a communication module by the second processor.

According to an embodiment of the present disclosure, a wearable electronic device may include an energy harvester for generating electrical energy on the basis of a motion with respect to the wearable electronic device, a plurality of sensors for sensing the motion, and a processor. The processor may determine whether to activate the plurality of sensors by the electrical energy received from the energy harvester, acquire sensor data from at least one of the plurality of sensors, and determine a user activity corresponding to the motion on the basis of the sensor data.

The processor may determine the user activity on the basis of at least one of the position of the energy harvester that has generated the electrical energy, the strength of the electrical energy, or the sensor data.

Each of the above-described elements of the electronic device may include one or more components. According to various embodiments, the electronic device may be configured to include at least one of the foregoing components, one or more of the above-described components may be omitted, or one or more other components may be added. Further, according to various embodiments, a part of the components of the electronic device may be integrated into a single entity. In such a case, the integrated entity may still perform one or more functions of each of the plurality of components in the same or similar manner as they are performed by a corresponding one of the plurality of components before the integration.

The embodiments disclosed in the present disclosure are given to describe and help understanding of the disclosure, not limiting the scope of the disclosure. Therefore, the scope of the disclosure should be interpreted as embracing all modifications or many other embodiments based on the technical spirit of the disclosure.

What is claimed is:
1. A wearable electronic device comprising:
    an energy harvester for generating electrical energy on the basis of a motion with respect to the wearable electronic device or a change in the shape of the wearable electronic device;
    a first processor for controlling the energy harvester;
    a first sensor and a second sensor; and
    a second processor for controlling the first sensor and the second sensor,
    wherein if the electrical energy generated by the energy harvester satisfies a predetermined first condition, the first processor is configured to transmit, to the second processor, a control signal for transitioning the second processor to an active state, and if the second processor is transitioned from an inactive state to the active state in response to the control signal, the second processor is configured to acquire first sensor data from the first sensor, and to selectively acquire second sensor data from the second sensor according to whether the first sensor data satisfies a predetermined second condition.

2. The wearable electronic device of claim 1, wherein the second processor is configured to transition the second sensor to the active state or the inactive state on the basis of the first sensor data.

3. The wearable electronic device of claim 1, wherein the energy harvester includes a first energy harvester corresponding to the first sensor, and a second energy harvester corresponding to the second sensor, and
wherein if the electrical energy is generated by the first energy harvester, the second processor is configured to selectively acquire the second sensor data.

4. The wearable electronic device of claim 3, wherein the first energy harvester is located in a first area of the wearable electronic device, and the second energy harvester is located in a second area of the wearable electronic device.

5. The wearable electronic device of claim 1, wherein the second processor is configured to determine a user activity corresponding to the wearable electronic device on the basis of the first sensor data, and to selectively acquire the second sensor data according to whether the user activity satisfies a predetermined third condition.

6. The wearable electronic device of claim 1, wherein if the first sensor data satisfies the predetermined second condition, the second processor is configured to acquire the second sensor data from the second sensor, and if the first sensor data does not satisfy the predetermined second condition, the second processor is configured to refrain from acquiring the second sensor data from the second sensor.

7. The wearable electronic device of claim 1, further comprising a third processor, and a third sensor corresponding to the third processor,
wherein the third processor acquires third sensor data from the third sensor.

8. The wearable electronic device of claim 7, wherein the second processor is configured to acquire the third sensor data from the third processor, and to determine a user activity corresponding to the wearable electronic device on the basis of the second sensor data and the third sensor data.

9. The wearable electronic device of claim 1, wherein the second processor is configured to determine a user activity corresponding to the wearable electronic device on the basis of the first sensor data, and to acquire the second sensor data from the second sensor in every one of first and second periods according to whether the user activity satisfies a predetermined third condition.

10. The wearable electronic device of claim 1, further comprising a communication module,
wherein the second processor is configured to transmit the first sensor data and the second sensor data to an external electronic device by using the communication module.

11. The wearable electronic device of claim 10, wherein the second processor is configured to determine the type of the external electronic device, to acquire the second sensor data, if the external electronic device is of a first type, and to refrain from acquiring the second sensor data, if the external electronic device is of a second type different from the first type.

12. A method of operating a wearable electronic device, comprising:
generating electrical energy on the basis of a motion with respect to the wearable electronic device or a change in the shape of the wearable electronic device by an energy harvester;
if the electrical energy generated by the energy harvester satisfies a predetermined first condition, transmitting, to a second processor, a control signal for transitioning the second processor to an active state by a first processor;
if the second processor is transitioned from an inactive state to the active state in response to the control signal, acquiring first sensor data from a first sensor by the second processor; and
selectively acquiring second sensor data from a second sensor by the second processor, according to whether the first sensor data satisfies a predetermined second condition.

13. The method of claim 12, wherein the acquisition of second sensor data by the second processor comprises transitioning the second sensor to the active state or the inactive state on the basis of the first sensor data.

14. The method of claim 12, wherein the energy harvester includes a first energy harvester corresponding to the first sensor, and a second energy harvester corresponding to the second sensor, and
wherein the acquisition of second sensor data by the second processor comprises, if the electrical energy is generated by the first energy harvester, selectively acquiring the second sensor data by the second processor.

15. The method of claim 12, wherein the acquisition of second sensor data by the second processor comprises:
determining a user activity corresponding to the wearable electronic device on the basis of the first sensor data; and
acquiring the second sensor data according to whether the user activity satisfies a predetermined third condition.

* * * * *